(12) United States Patent
De La Garrigue et al.

(10) Patent No.: US 8,831,659 B2
(45) Date of Patent: Sep. 9, 2014

(54) MEDIA ACCESS CONTROLLER FOR USE IN A MULTI-SECTOR ACCESS POINT ARRAY

(75) Inventors: Michael De La Garrigue, Agoura Hills, CA (US); Shaun Clem, Thousand Oaks, CA (US); Michael R. Conley, Thousand Oaks, CA (US); David B. Rosen, Woodland Hills, CA (US); Drew Bertagna, Thousand Oaks, CA (US)

(73) Assignee: Xirrus, Inc., Thousand Oaks, CA (US)

( * ) Notice: Subject to any disclaimer, the term of this patent is extended or adjusted under 35 U.S.C. 154(b) by 482 days.

(21) Appl. No.: 11/816,061

(22) PCT Filed: Mar. 9, 2006

(86) PCT No.: PCT/US2006/008744
§ 371 (c)(1),
(2), (4) Date: May 12, 2008

(87) PCT Pub. No.: WO2006/096864
PCT Pub. Date: Sep. 14, 2006

(65) Prior Publication Data
US 2008/0268778 A1     Oct. 30, 2008

Related U.S. Application Data

(60) Provisional application No. 60/660,171, filed on Mar. 9, 2005, provisional application No. 60/660,276, filed on Mar. 9, 2005, provisional application No. 60/660,375, filed on Mar. 9, 2005, provisional application No. 60/660,275, filed on Mar. 9, 2005, provisional application No. 60/660,210, filed on Mar. 9, 2005, provisional application No. 60/660,174, filed on Mar. 9, 2005, provisional application No. 60/660,394, filed on Mar. 9, 2005, provisional (Continued)

(30) Foreign Application Priority Data

| Mar. 9, 2006 | (WO) | ................ | PCT/US2006/008696 |
| Mar. 9, 2006 | (WO) | ................ | PCT/US2006/008698 |
| Mar. 9, 2006 | (WO) | ................ | PCT/US2006/008743 |
| Mar. 9, 2006 | (WO) | ................ | PCT/US2006/008747 |

(51) Int. Cl.
*H04B 7/00* (2006.01)
*H04W 84/12* (2009.01)
*H01Q 21/20* (2006.01)
*H01Q 9/28* (2006.01)
*H01Q 19/10* (2006.01)
*H01Q 1/00* (2006.01)

(52) U.S. Cl.
CPC ............. *H04W 84/12* (2013.01); *H01Q 21/205* (2013.01); *H01Q 9/285* (2013.01); *H01Q 19/106* (2013.01); *H01Q 1/007* (2013.01)
USPC .......... 455/515; 455/434; 455/67.11; 455/458

(58) Field of Classification Search
USPC ........ 455/517, 422.1, 426.1, 426.2, 434, 446, 455/454, 515, 67.11, 458; 370/310, 327, 370/328, 338, 401, 411, 465, 466
See application file for complete search history.

(56) References Cited

U.S. PATENT DOCUMENTS

| 4,042,935 A | 8/1977 | Ajioka et al. |
| 4,649,391 A | 3/1987 | Tsuda et al. |

(Continued)

*Primary Examiner* — John J Lee
(74) *Attorney, Agent, or Firm* — Francisco A. Rubio-Campos; The Eclipse Group, LLP

(57) ABSTRACT

A wireless access point with a centralized media access controller MAC (402) that enables multiple radios (404, 412, 408) to share MAC resources and implement load balancing and frequency control.

27 Claims, 19 Drawing Sheets

Related U.S. Application Data application No. 60/660,209, filed on Mar. 9, 2005, provisional application No. 60/660,393, filed on Mar. 9, 2005, provisional application No. 60/660,269, filed on Mar. 9, 2005, provisional application No. 60/660,391, filed on Mar. 9, 2005, provisional application No. 60/660,392, filed on Mar. 9, 2005, provisional application No. 60/660,277, filed on Mar. 9, 2005, provisional application No. 60/660,302, filed on Mar. 9, 2005, provisional application No. 60/660,376, filed on Mar. 9, 2005, provisional application No. 60/660,541, filed on Mar. 9, 2005.

(56) References Cited

U.S. PATENT DOCUMENTS

| | | | |
|---|---|---|---|
| 4,726,050 | A | 2/1988 | Menich et al. |
| 5,389,941 | A | 2/1995 | Yu |
| 5,952,983 | A | 9/1999 | Dearnley et al. |
| 6,140,972 | A | 10/2000 | Johnston et al. |
| 6,157,811 | A | 12/2000 | Dent |
| 6,326,926 | B1 | 12/2001 | Shoobridge et al. |
| 6,329,954 | B1 | 12/2001 | Fuchs et al. |
| 6,374,078 | B1 | 4/2002 | Williams et al. |
| 6,452,565 | B1 | 9/2002 | Kingsley et al. |
| 6,539,204 | B1 | 3/2003 | Marsh et al. |
| 6,544,173 | B2 | 4/2003 | West et al. |
| 6,606,059 | B1 | 8/2003 | Barabash |
| 6,646,611 | B2 | 11/2003 | Plet et al. |
| 6,888,504 | B2 | 5/2005 | Chiang et al. |
| 6,903,703 | B2 | 6/2005 | Durham et al. |
| 6,933,909 | B2 | 8/2005 | Theobold |
| 7,057,566 | B2 | 6/2006 | Theobold |
| 7,103,386 | B2 | 9/2006 | Hoffmann et al. |
| 7,119,744 | B2 | 10/2006 | Theobold et al. |
| 7,193,562 | B2 | 3/2007 | Shtrom et al. |
| 7,202,824 | B1 | 4/2007 | Sanelli et al. |
| 7,253,783 | B2 | 8/2007 | Chiang et al. |
| 7,274,944 | B2 | 9/2007 | Lastinger et al. |
| 7,292,198 | B2 | 11/2007 | Shtrom et al. |
| 7,358,912 | B1 | 4/2008 | Kish et al. |
| 7,362,280 | B2 | 4/2008 | Shtrom et al. |
| 7,498,996 | B2 | 3/2009 | Shtrom et al. |
| 7,498,999 | B2 | 3/2009 | Shtrom |
| 7,505,447 | B2 | 3/2009 | Kish et al. |
| 7,511,680 | B2 | 3/2009 | Shtrom et al. |
| 7,525,486 | B2 | 4/2009 | Shtrom et al. |
| 7,567,213 | B2 | 7/2009 | Liu |
| 7,646,343 | B2 | 1/2010 | Shtrom et al. |
| 7,652,632 | B2 | 1/2010 | Shtrom |
| 7,675,474 | B2 | 3/2010 | Shtrom et al. |
| 7,680,085 | B2 * | 3/2010 | Willins et al. ............ 370/338 |
| 7,696,946 | B2 | 4/2010 | Shtrom |
| 7,787,436 | B2 | 8/2010 | Kish et al. |
| 7,864,119 | B2 | 1/2011 | Shtrom et al. |
| 2001/0033600 | A1 | 10/2001 | Yang et al. |
| 2002/0039082 | A1 | 4/2002 | Fox et al. |
| 2002/0163933 | A1 * | 11/2002 | Benveniste ............ 370/465 |
| 2003/0040319 | A1 | 2/2003 | Hansen et al. |
| 2004/0001429 | A1 | 1/2004 | Ma et al. |
| 2004/0005227 | A1 | 1/2004 | Cremer et al. |
| 2004/0052227 | A1 | 3/2004 | Judd et al. |
| 2004/0066326 | A1 | 4/2004 | Knapp |
| 2004/0102222 | A1 | 5/2004 | Skafidas et al. |
| 2004/0105412 | A1 * | 6/2004 | He et al. ............ 370/338 |
| 2004/0143681 | A1 * | 7/2004 | Benveniste ............ 709/249 |
| 2004/0157551 | A1 | 8/2004 | Gainey et al. |
| 2004/0196813 | A1 | 10/2004 | Ofek et al. |
| 2004/0203347 | A1 | 10/2004 | Nguyen |
| 2004/0224637 | A1 | 11/2004 | Silva et al. |
| 2004/0240424 | A1 | 12/2004 | Fong et al. |
| 2004/0242274 | A1 | 12/2004 | Corbett et al. |
| 2004/0259558 | A1 | 12/2004 | Shafidas et al. |
| 2004/0259563 | A1 | 12/2004 | Morton et al. |
| 2005/0020299 | A1 | 1/2005 | Malone et al. |
| 2005/0025254 | A1 | 2/2005 | Awad et al. |
| 2005/0035919 | A1 | 2/2005 | Yang et al. |
| 2005/0058097 | A1 | 3/2005 | Kang et al. |
| 2005/0058111 | A1 | 3/2005 | Hung et al. |
| 2005/0226206 | A1 * | 10/2005 | An ............ 370/349 |
| 2005/0237258 | A1 | 10/2005 | Abramov et al. |
| 2005/0254470 | A1 | 11/2005 | Yashar |
| 2005/0255892 | A1 | 11/2005 | Wong et al. |
| 2006/0038738 | A1 | 2/2006 | Shtrom |
| 2006/0098616 | A1 | 5/2006 | Kish et al. |
| 2006/0109799 | A1 | 5/2006 | Tseng et al. |
| 2006/0233280 | A1 | 10/2006 | Tynderfeldt et al. |
| 2007/0066234 | A1 | 3/2007 | Lastinger et al. |
| 2007/0178927 | A1 | 8/2007 | Fernandez-Corbaton et al. |
| 2007/0293178 | A1 | 12/2007 | Milton et al. |
| 2008/0136715 | A1 | 6/2008 | Shtrom et al. |
| 2008/0137681 | A1 | 6/2008 | Kish et al. |
| 2008/0221918 | A1 | 9/2008 | Petersen et al. |
| 2008/0225814 | A1 | 9/2008 | Thermond et al. |
| 2008/0268778 | A1 | 10/2008 | De La Garrigue et al. |
| 2008/0274748 | A1 | 11/2008 | Lastinger et al. |
| 2008/0291098 | A1 | 11/2008 | Kish et al. |
| 2008/0291870 | A1 * | 11/2008 | Chen et al. ............ 370/328 |
| 2009/0028095 | A1 | 1/2009 | Kish |
| 2009/0075606 | A1 | 3/2009 | Shtrom et al. |
| 2010/0053010 | A1 | 3/2010 | Shtrom et al. |
| 2010/0053023 | A1 | 3/2010 | Shtrom et al. |
| 2010/0103065 | A1 | 4/2010 | Shtrom et al. |
| 2010/0103066 | A1 | 4/2010 | Shtrom et al. |

* cited by examiner

MEDIA ACCESS CONTROLLER FOR USE IN A MULTI-SECTOR ACCESS POINT ARRAY

1. RELATED APPLICATION

This application claims priority to the provisional patent applications, Ser. No. 60/660,171, titled "WIRELESS LAN ARRAY," by Dirk I. Gates, Ian Laity Mick Conley, Mike de la Garrigue, and Steve Smith, filed on Mar. 9, 2005, and incorporated herein by reference; Ser. No. 60/660,276, titled "WIRELESS LAN ARRAY," by Dirk I. Gates, Ian Laity, Mick Conley, Mike de la Garrigue, and Steve Smith, filed on Mar. 9, 2005, and incorporated herein by reference; Ser. No. 60/660,375, titled "WIRELESS ACCESS POINT," by Dirk I. Gates and Ian Laity, filed on Mar. 9, 2005, and incorporated herein by reference; Ser. No. 60/660,275, titled "MULTI-SECTOR ACCESS POINT ARRAY," by Dirk I. Gates Ian Laity, Mick Conley, Mike de la Garrigue, and Steve Smith, filed on Mar. 9, 2005, and incorporated herein by reference; Ser. No. 60/660,210, titled "MEDIA ACCESS CONTROLLER FOR USE IN A MULTI-SECTOR ACCESS POINT ARRAY," by Mike de la Garrigue and Drew Bertagna filed on Mar. 9, 2005, and incorporated herein by reference; Ser. No. 60/660,174, titled "QUEUE MANAGEMENT CONTROLLER FOR USE IN A MULTI-SECTOR ACCESS POINT ARRAY," by Mike de la Garrigue and Drew Bertagna filed on Mar. 9, 2005, and incorporated herein by reference; Ser. No. 60/660,394, titled "WIRELESS LAN ARRAY," by Dirk I. Gates, Ian Laity, Mick Conley, Mike de la Garrigue, and Steve Smith, filed on Mar. 9, 2005, and incorporated herein by reference; Ser. No. 60/660,209, titled "WIRELESS LAN ARRAY ARCHITECTURE," by Dirk I. Gates, Ian Laity, Mick Conley, Mike de la Garrigue, and Steve Smith, filed on Mar. 9, 2005, and incorporated herein by reference; Ser. No. 60/660,393, titled "ANTENNA ARCHITECTURE OF A WIRELESS LAN ARRAY," by Abraham Hartenstein, filed on Mar. 9, 2005, and incorporated herein by reference; Ser. No. 60/660,269, titled "LOAD BALANCING IN A MULTI-RADIO WIRELESS LAN ARRAY BASED ON AGGREGATE MEAN LEVELS," by Mick Conley filed on Mar. 9, 2005, and incorporated herein by reference; Ser. No. 60/660,392, titled "ADVANCED ADJACENT CHANNEL SECTOR MANAGEMENT FOR 802.11 TRAFFIC," by Mick Conley filed on Mar. 9, 2005, and incorporated herein by reference; Ser. No. 60/660,391, titled "LOAD BALANCING IN A MULTI-RADIO WIRELESS LAN ARRAY BASED ON AGGREGATE MEAN LEVELS," by Shaun Clem filed on Mar. 9, 2005, and incorporated herein by reference; Ser. No. 60/660,277, titled "SYSTEM FOR TRANSMITTING AND RECEIVING FRAMES IN A MULTI-RADIO WIRELESS LAN ARRAY," by Dirk I. Gates and Mike de la Garrigue, filed on Mar. 9, 2005, and incorporated herein by reference; Ser. No. 60/660,302, titled "SYSTEM FOR ALLOCATING CHANNELS IN A MULTI-RADIO WIRELESS LAN ARRAY," by Dirk I. Gates and Kirk Mathews, filed on Mar. 9, 2005, and incorporated herein by reference; Ser. No. 60/660,376, titled "SYSTEM FOR ALLOCATING CHANNELS IN A MULTI-RADIO WIRELESS LAN ARRAY," by Dirk I. Gates and Kirk Mathews, filed on Mar. 9, 2005, and incorporated herein by reference; Ser. No. 60/660,541, titled "MEDIA ACCESS CONTROLLER FOR USE IN A MULTI-SECTOR ACCESS POINT ARRAY," by Dirk I. Gates and Mike de la Garrigue, filed on Mar. 9, 2005, and incorporated herein by reference; and PCT patent application, serial number PCT/US2006/008747, titled "WIRELESS LOCAL AREA NETWORK ANTENNA ARRAY," filed on Mar. 9, 2006, which claims priority to the above provisional patent applications, and incorporated by reference herein; PCT patent application serial number PCT/US2006/008696, titled "WIRELESS ACCESS POINT," filed on Mar. 9, 2006, and incorporated by reference herein; PCT patent application serial number PCT/US2006/008743, titled "ACCESS POINT IN A WIRELESS LAN," filed on Mar. 9, 2006, and incorporated by reference herein; and PCT patent application serial number PCT/US2006/008698, titled "SYSTEM FOR ALLOCATING CHANNELS IN A MULTI-RADIO WIRELESS LAN ARRAY," filed Mar. 9, 2006, and incorporated by reference herein.

2. FIELD OF THE INVENTION

This invention relates generally to communication devices, and more particularly to media access controllers in a wireless local area network.

3. RELATED ART

Telecommunications systems and networking equipment transfer data through some type of medium. The medium is typically defined as the physical means by which data is transported from one point to another. Examples of common media used in today's data communication networks are copper wire for electrical signaling, glass fiber for optical signaling, and radio waves for wireless communications.

Also common to networking equipment is the concept of managing data exchanges on the medium. Whenever there are two or more devices sharing a medium there must be a prescribed way for them to transfer data without interfering with each other. Protocols are often designed for using a particular medium. Rules imposed by such organizations may include things like minimum and maximum data packet sizes, handshaking routines for data exchanges, timing parameters governing frame transmissions and special frame types for conveying medium control information. The hardware and software logic that implements these rules is commonly known as the Media Access Controller (MAC). In a wireless system the MAC controls the data transfers performed by radios in the network as seen in FIG. 1.

In FIG. 1, an example of a wireless Access Point with a single MAC architecture is shown. The MAC interfaces to baseband logic on the radio side and to a data bus on the system side. The radio may consist of a digital baseband module and an analog amplifier/RF module. There is only one radio in this system, so the MAC is limited to communicating with it exclusively.

Typically the MAC is tightly coupled to the physical medium, meaning that it may perform its functions very rapidly with respect to the reception and transmission of frames on the medium. The faster data traverses the medium the faster the MAC must be able to perform. For this reason, MAC logic is typically implemented in hardware such as an ASIC or FPGA. It is also not uncommon to make one-for-one pairings of a MAC with the media that it controls. For instance, an Ethernet port has a MAC chip or logic dedicated to the port. Similarly if a device such as an Ethernet switch has multiple Ethernet ports, each port has its own MAC logic dedicated to it.

In FIG. 2, for example, a multi-radio Access Point system with a distributed MAC architecture is shown. It is constructed conceptually by replicating the components of the single radio access point N times, where N is the number of radios in the system. While there are multiple radios in the system, each radio has its own dedicated MAC. Each MAC communicates exclusively with its own radio and operates independently of the other MACs in the system.

Therefore, there is a need for an approach to provide a highly integrated wireless system with a MAC that has a more centralized position among the various radios while still maintaining tight integration to each one. A centralized MAC services multiple radios from a single ASIC while maintaining the processing speeds required by each radio. A centralized MAC would benefit from higher integration and resource sharing over a distributed MAC implementation, in addition to lower system cost. It also benefits from having access to information from all the radios in the system simultaneously allowing it to perform additional processing that is unachievable by distributed MACs.

SUMMARY

An approach for providing a highly integrated wireless system with a MAC that has a centralized position among the various radios and tight integration with each of the radios. The centralized MAC may service multiple radios from a single ASIC while maintaining the processing speeds required by each radio. The centralized MAC benefits from higher integration and resource sharing over a distributed MAC implementation, in addition to lower system cost. It is also a benefit to have access to information from all the radios in the system simultaneously allowing it to perform additional processing, such as load balancing that is unachievable by distributed MACs. The additional processing may include making decisions on when to transmit out a particular radio based not only on activity on its own medium but also on the activity of other radios in the system with which it might interfere.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

DETAILED DESCRIPTION

Figure 1:
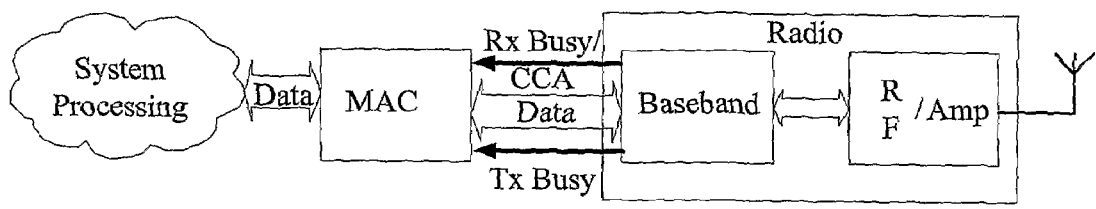
FIG. 1 is a block diagram of a prior art Media Access Controller (MAC) for controlling a radio.
Figure 2:
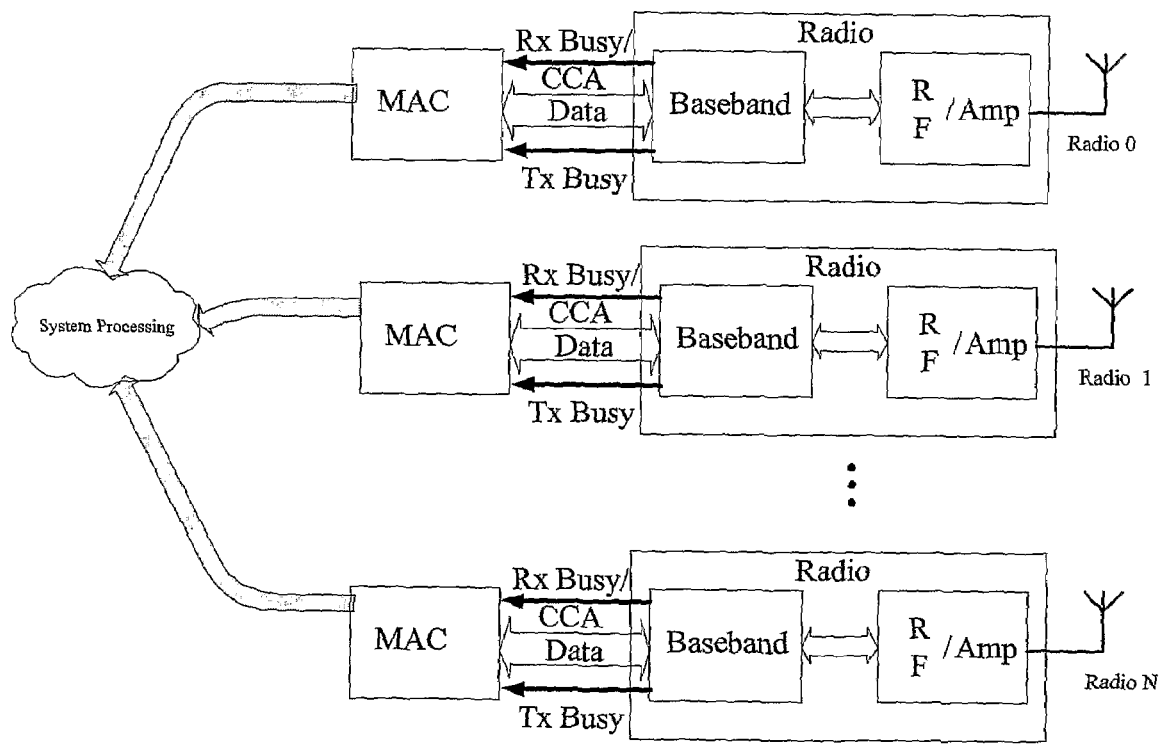
FIG. 2 is a block diagram of prior art implementation of multiple radios with each radio controlled by a respective MAC.

In the prior art systems depicted in FIGS. 1 and 2, frame transmissions are initiated by the system logic when frames are transferred into the MAC for processing. The MAC responds by checking its set of rules governing frame transmission against the current state of the medium. One of the primary rules in many wireless systems is to defer frame transmission while a frame is being received off the wireless medium. The MAC is made aware of frame reception by signaling from the baseband logic. In the diagram the lines 'Rx Busy' and 'CCA' represent this. The MAC must wait until the medium is free before it can initiate a frame transmission. Another rule common to wireless systems is to wait a fixed amount of time after the reception or transmission of a frame before initiating a new transmission.

Figure 3:
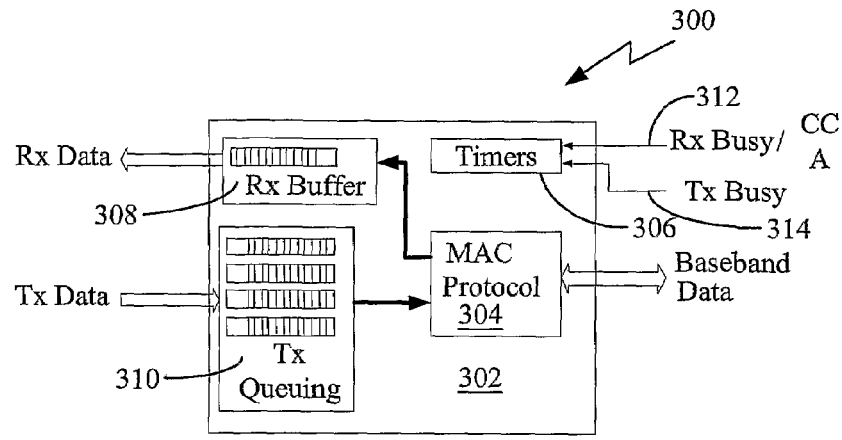
FIG. 3 is a block diagram of the architecture of a MAC device.

In FIG. 3, a block diagram of the architecture 300 of the MAC device 302 is shown. Within the MAC module 302 there is typically some kind of logic that implements a protocol 304 that encapsulates and enforces all of the access rules to the medium. This is the controller for all frame transmissions and receptions. Baseband data is received at the MAC module 302 and processed by the MAC protocol 304. The processed data is then made available to receive buffers 308. Data for transmission is received at the MAC module via transmit queues 310 that are accessed by the MAC protocol 304 and sent via the broadband medium. The MAC module 302 also initiates a timeout period under those and other conditions and holds the frame transmission until the expiration of the timing period. In the FIG. 3, a timing submodule 306 within the MAC called 'Timers' represents this holding of the frame transmission timing. The timing submodule 306 may receive control signals such as receive busy/CCA 312 and transmit busy 314.

Since the MAC must often wait before transmitting a frame, its memory may store the frame until the MAC protocol 304 can send it. In systems that implement Quality-of-Service (QOS), multiple memories within the MAC may be used so that lower priority frames can be held while higher priority frames are transmitted. The number and size of memories to store transmit frames is system dependent. In FIG. 3 the Tx frames may be stored in a submodule within the MAC called 'TX Queueing' 310 represents storage and queues. When all the transmission rules have been met the MAC protocol 304, then the MAC protocol 304 may initiate frame transmission. The MAC protocol 304 signals the baseband logic that frame transmission is starting and then starts the transfer of frame data to the radio (not shown).

Frame reception is initiated when radio energy received by the antenna is detected and interpreted by the radio to be modulated and encoded as a valid data transfer over the wireless medium. The baseband logic indicates to the MAC module 302 that a frame is being received and starts transferring the data to the MAC module 302. When the MAC module 302 has completely received the frame it responds by checking its set of rules governing frame reception against the content and integrity of the frame contained in the MAC protocol 304. Depending on the MAC protocol 304 the MAC module 302 may take a number of actions including initiating timers, initiating transmission of a response frame, accepting the frame and passing it to the system, or rejecting the frame as invalid.

Figure 4:
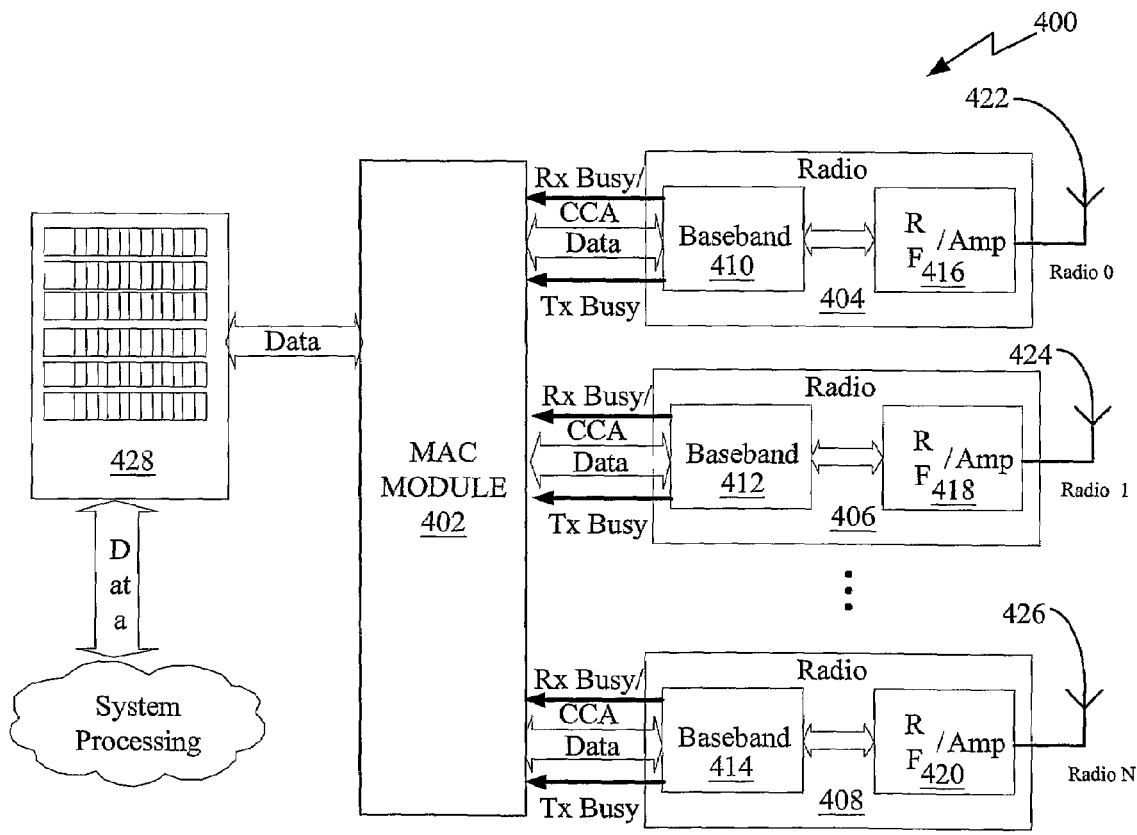
FIG. 4 is a multi-radio access point system with a centralized MAC module.

Turning to FIG. 4, a multi-radio access point system 400 with a centralized MAC module 402 is shown. A centralized MAC module 402 replaces the multiple MAC modules of the distributed architecture. The centralized MAC module 402 is in signal communication with a number of radios 404, 406 and 408 with each radio having a transceiver that is able to transmit and receive radio signals. Each radio 404, 406 and 408 may have a baseband module 410, 412 and 414 respectively. An example of the baseband module may be the AGERE™ (64040) tri-mode baseband modem chipset which supports 802.11a, b, and g modes of operation. Each baseband module 410, 412 and 414 is in signal communication with and RF/AMP module 416, 418 and 420 where each RF/AMP module is also coupled to an antenna 422, 424 and 426. The MAC module 402 may have a central Tx and Rx queue structure 428. The bus between the central TX and RX queue structure 428 and the MAC module 402 may be an 8-bit 66 MHz synchronous bus with multiplexed control, address, and data. The synchronous bus may also function in a time division multiplexed basis for transferring data to and from the MAC module 402. In other implementations, different size buses may be used operating at frequencies other than 66 MHz.

Figure 5:
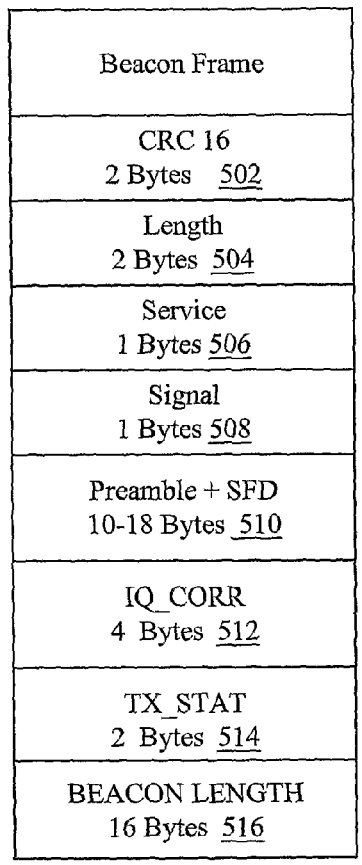
FIG. 5 is a beacon fifo offset for a Complementary Code Keying (CCK) frame offset version definition for use in the centralized MAC of FIG. 4.

In FIG. 5, a beacon fifo offset for a Complementary Code Keying (CCK) frame offset version definition 500 for use with the centralized MAC module 402 of FIG. 4 is shown. The beacon frame 500 may contain a CRC 502 with a length of two bytes. The length of the frame offset 504 may be the next two bytes. A service indicator 506 may be one byte long in addition to a signal 508 of one byte. Addition information may also be contained in the frame, such as a preamble 510, IQ correlation 512, transmit status 514, and beacon length 516 over the next 32-38 bytes.

Figure 6:
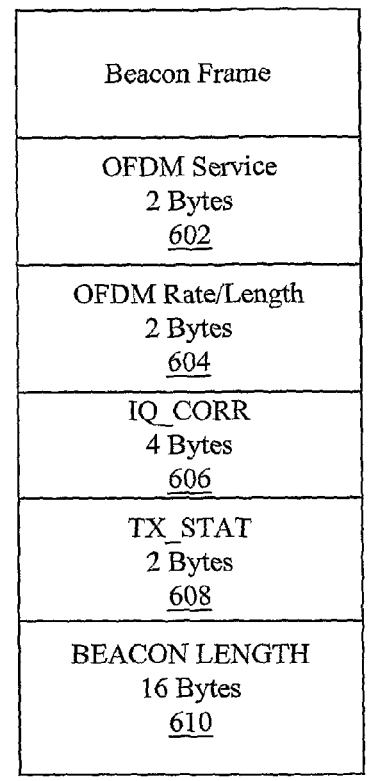
FIG. 6 is a beacon fifo offset for a Orthogonal Frequency Division Multiplexing (OFDM) frame offset version definition for use in the centralized MAC module of FIG. 4.

In FIG. 6, a beacon fifo offset for a Orthogonal Frequency Division Multiplexing (OFDM) frame offset version definition 600 for use with the centralized MAC module 402 of FIG. 4 is shown. The OFDM frame 600 identifies the OFDM service 602 in 2 byes. The OFDM rate and length 604 may be identified in two bytes. The IQ correlation 606 may be identified in four bytes and a transmit status in two bytes 608. The beacon length 610 may be fixed at sixteen bytes Many of the resources spread out in the distributed MAC architecture of FIG. 2 may be collated in the centralized MAC module 402 resulting in higher performance and lower cost. These functions include, but aren't limited to, the transmission queuing structure, the MAC protocol function, and common timers and counters.

Figure 7:
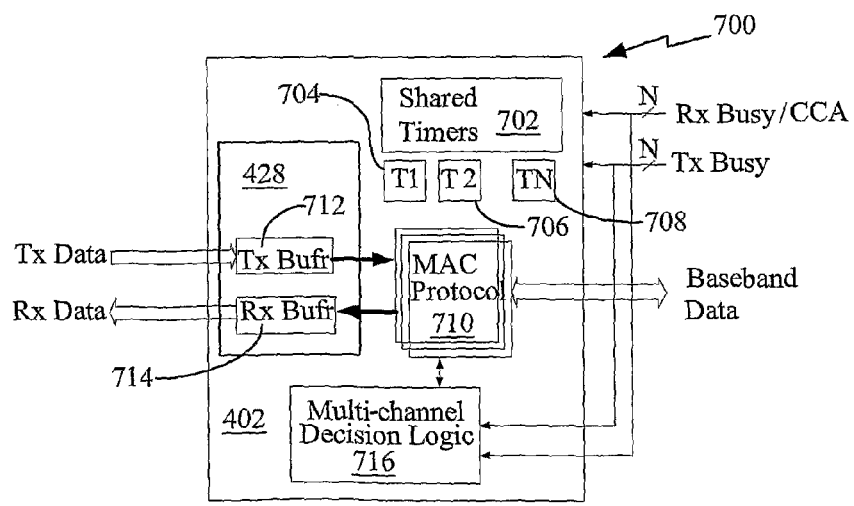
FIG. 7 is a block diagram of an example of the architecture of the MAC module 402 of FIG. 4.

In FIG. 7, a block diagram 700 of an example of the architecture of the MAC module 402 of FIG. 4 is shown. Integration of the various functions may be realized in different ways depending on the purpose of the function. In the current example a single instance of the function may provide its service for multiple radios. For example, shared timers 702, T1 704, T2 706, TN 708, MAC protocol 710, Tx buffers 712, Rx buffers 714, and a Multi-channel Decision logic module 716. In other embodiments, the function may still be replicated with the resources in a single location.

The Tx buffers 712 and Rx buffers 714 are examples of the 'gathering' benefit with a centralized queue structure 428 of FIG. 4. The buffers 712 and 714 may be either integrated within the centralized MAC device, or in other implementations, placed in a separate chip, implemented in the data storage space of a microprocessor, or some combination of the above. A dedicated packet memory may be added to the centralized MAC module 402 to enhance throughput and improve performance. The centralized queue 428 enable greater integration, flexibility and cost savings for various realizations of multi-radio access points.

The MAC Protocol 710 regulates all traffic to and from the wireless medium. In a multi-radio system all of the media (radios) are typically identical and must adhere to the same access rules as administered by the MAC Protocol 710. Therefore a single MAC Protocol 710 may be sufficient to control all of the radios. In FIG. 7, the MAC Protocol 710 drawn with several 'shadow' instances denotes this. In practice, the MAC Protocol 710 may be shared among the multiple radios in a process known as Time Division Multiplexing, or TDM.

In the TDM implementation a single instance of a function is utilized by one device or client for a fixed amount of time, then switched over to a different client for the same fixed amount of time, then another, and another, and so forth until all the clients have been serviced. The function is then switched back to the first client and the cycle repeats. The obvious savings is apparent in the reduction from N instances of the function down to a single instance of it.

Timers are another example of shared resource, i.e., shared timers 702. Access to the wireless media requires the use of certain timers to correctly tag and separate frames. Some timers must be dedicated to the medium due to the random nature of frame arrivals to a radio. Those timers 704, 706 and 708 are depicted separately within the MAC module 402 in FIG. 7. Global types of timing functions are independent of frame reception and can be shared among the radios. One example of this type of function is a reference timer whose value is placed into transmission frames as they are being transferred out of the centralized MAC module 402. The embedded value 'tags' all the frames so that receiving devices can discern their relative transmission times. This type of 'timestamp' timer only needs to continually increment and a single, non-TDM instance of it is sufficient for all radios in the system.

The shared multi-channel decision logic 716 of FIG. 7 refers to the decision-making performed by the centralized MAC module 402 utilizing information from the multiple radios. This type of logic does not exist in the prior art distributed system. In the distributed system, however, data and control signals from all the radios are available to the centralized MAC module 402.

Multi-channel Decision Logic block 716 enables a multi-radio wireless system, such as a multi-radio access point, to manage the multiple radios and reduce the adjacent radio interference caused by the multiple radios. Adjacent radios transmitting on frequencies that are 'close' to each other may interfere with each other. "Close" in this context means that their center frequencies are close enough together that their corresponding sidebands may overlap with each other. The effect is that a radio in the multi-radio access point may not be able to receive a signal correctly from a client device because a second radio in the multi-radio access point, whose sideband frequencies overlap, is transmitting simultaneously with the client. The client's transmission may be inadvertently corrupted by the second radio.

Multi-channel Decision Logic 716 makes the MAC module 402 aware of the activity on all radios. In the situation in the preceding paragraph, techniques can be introduced to the MAC module 402 and MAC protocol 710 to help mitigate the effects of adjacent channel interference. Synchronization logic may be used to reduce the occurrences of transmission on one radio if it might affect another radio in the multi-radio system.

The 802.11a/b/g multi-radio access point architecture places multiple radios inside a single unit with each radio operating simultaneously on different non-overlapping channels in the 2.4 GHz and/or 5 GHz bands. Each radio may communicate through a directional antenna to the wireless medium with an antenna pattern that covers a radial segment of the overall intended coverage area. The union of all antenna patterns generated by the radios may cover a full 360 degrees of coverage area. This results in much higher sustained bandwidth than the typical single-radio AP and therefore may requires one or more Gigabit Ethernet connections to the wired medium for maximum capacity. In other implementations, slower connection may be used with a resulting impact on maximum throughput. This multi-radio access point architecture also may include an internal N×N switch to allow traffic received from any radio to be transmitted to any other radio with the switching decision and queuing mechanisms performed within a module of the multi-radio access point, such as the MAC module 402. In order to support multiple radios simultaneously and to support high bandwidth operation while maintaining data quality of service (QoS), queue management and MAC frame translation between Ethernet and 802.11 frame formats may be used.

Figure 8:
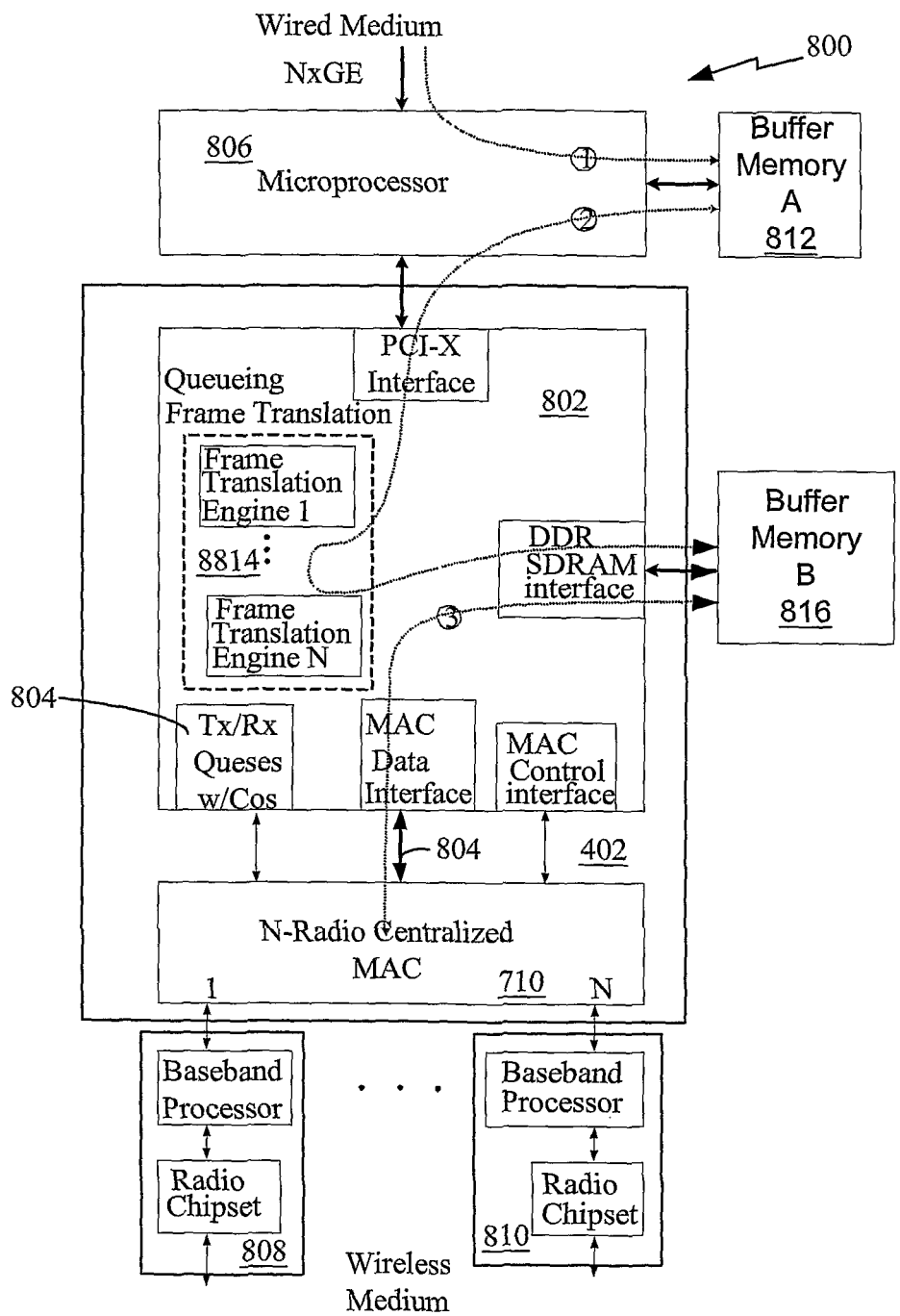
FIG. 8 is a block diagram illustrating a data path through the MAC protocol of the multi-radio access point.

Turning to FIG. 8, a block diagram 800 illustrating a data path through the MAC protocol 710 of the multi-radio access point is shown. For implementation reasons, the MAC protocol 710 may be physically split from the Frame Translation and Queuing logic 802 with a high-speed bus interconnect 804. However, the components can all be logically grouped into the MAC layer or module 402 of operation.

The major differences between this data path architecture and the single-radio data path architecture include the microprocessor (or similar controller) 806 and centralized MAC module 402 supports N radios (such as radios 808 and 810) in a centralized fashion. This includes hardware-based transmit and receive class of service CoS queuing 810 In other implementations, transmit and receive quality of service QoS queuing may be used in place of CoS queuing. The centralized hardware frame translation engine 802 performs all MAC frame header translations, encryption/decryption, and fragmentation-defragmentation. This minimizes the frame processing that must be done by the microprocessor 806. An additional buffer memory may be added to buffer frames that are queued for transmission to the MAC protocol 710 or are queued after reception from the MAC protocol 710. This reduces bandwidth requirements on the bus 804 and buffer memory A 812 when performing frame translation.

This architecture may allow three different data paths: (1) wired to wireless, (2) wireless to wired, and (3) wireless to wireless (note that wired to wired is also a valid path, but would only be used for control frames). In the wired to wireless data path, an Ethernet frame is received from the wired medium via an Ethernet port and is stored in buffer memory A 812. The microprocessor 806 determines the destination of the Ethernet frame. Assuming the Ethernet frame is destined for the wireless medium, it builds the appropriate descriptor for the frame in buffer memory A 812 and queues a pointer to the Ethernet frame to the Frame Translation Engine (FTE) 814. The FTE 814 streams the Ethernet frame and descriptor from buffer memory A 812 and translates the frame on-the-fly into an appropriate 802.11 frame format. The resultant frame is then streamed into buffer memory B 816. The FTE then queues a pointer to the frame back to the microprocessor 806. The microprocessor 806 adds a pointer to the frame to the desired transmit CoS queue on the desired radio within the hardware-based queuing engine 802. When the MAC protocol 710 schedules the frame for delivery to the wireless medium, the frame is read from buffer memory B 816 and streamed to the MAC protocol 710.

In the wireless to wired path, an 802.11 frame is received from the wireless medium via a radio 808 and is stored in buffer memory B 816. A pointer to the 802.11 frame is queued to the microprocessor 806 by the hardware-based queuing engine 802. The microprocessor 806 builds the appropriate descriptor for the 802.11 frame in buffer memory A 812 and queues a pointer to the frame to a FTE 814. The FTE streams the 802.11 descriptor from buffer memory A 812 and the 802.11 frame from buffer memory B 812 and translates the frame on-the-fly via the FTE 814 into the appropriate Ethernet frame format. The resultant Ethernet frame is streamed into buffer memory A 812. The FTE 814 then queues a pointer to the frame back to the microprocessor 806. The microprocessor 806 determines the destination of the Ethernet frame. Assuming the destination is the wired medium, the microprocessor 806 queues the frame to the Ethernet port. When the frame is scheduled for delivery, it is streamed out of buffer memory A 812 and delivered to the Ethernet.

In the wireless-to-wireless path, an 802.11 frame is received from the wireless medium and is stored in buffer memory B 816. A pointer to the 802.11 frame is queued to the microprocessor 806 by the hardware-based queuing engine 802. The microprocessor 806 builds the appropriate descriptor for the 802.11 frame in buffer memory A 812 and queues a pointer to the 802.11 frame to the FTE 814. The FTE 814 streams the 802.11 descriptor from buffer memory A 812 and the frame from buffer memory B 816 and translates the 802.11 frame on-the-fly into the appropriate Ethernet frame format. The resultant Ethernet frame is streamed into buffer memory A 812. The FTE then queues a pointer to the Ethernet frame back to the microprocessor. The microprocessor 806 determines the destination of the Ethernet frame. Assuming it is destined for the wireless medium, it builds the appropriate descriptor for the frame in buffer memory A 812 and queues a pointer to the Ethernet frame to a FTE 814. The FTE 814 streams the Ethernet frame and descriptor from buffer memory A 812 and translates the frame on-the-fly into an appropriate 802.11 frame format. The resultant 802.11 frame is streamed into buffer memory B 816. The FTE then queues a pointer to the 802.11 frame back to the microprocessor 806. The microprocessor 806 adds the pointer to the 802.11 frame to the desired transmit CoS queue on the desired radio 808 within the hardware-based queuing engine 802. When the MAC protocol 710 schedules the 802.11 frame for delivery to the wireless medium, the 802.11 frame is read from buffer memory B 816 and streamed to the MAC protocol 710.

Figure 9:
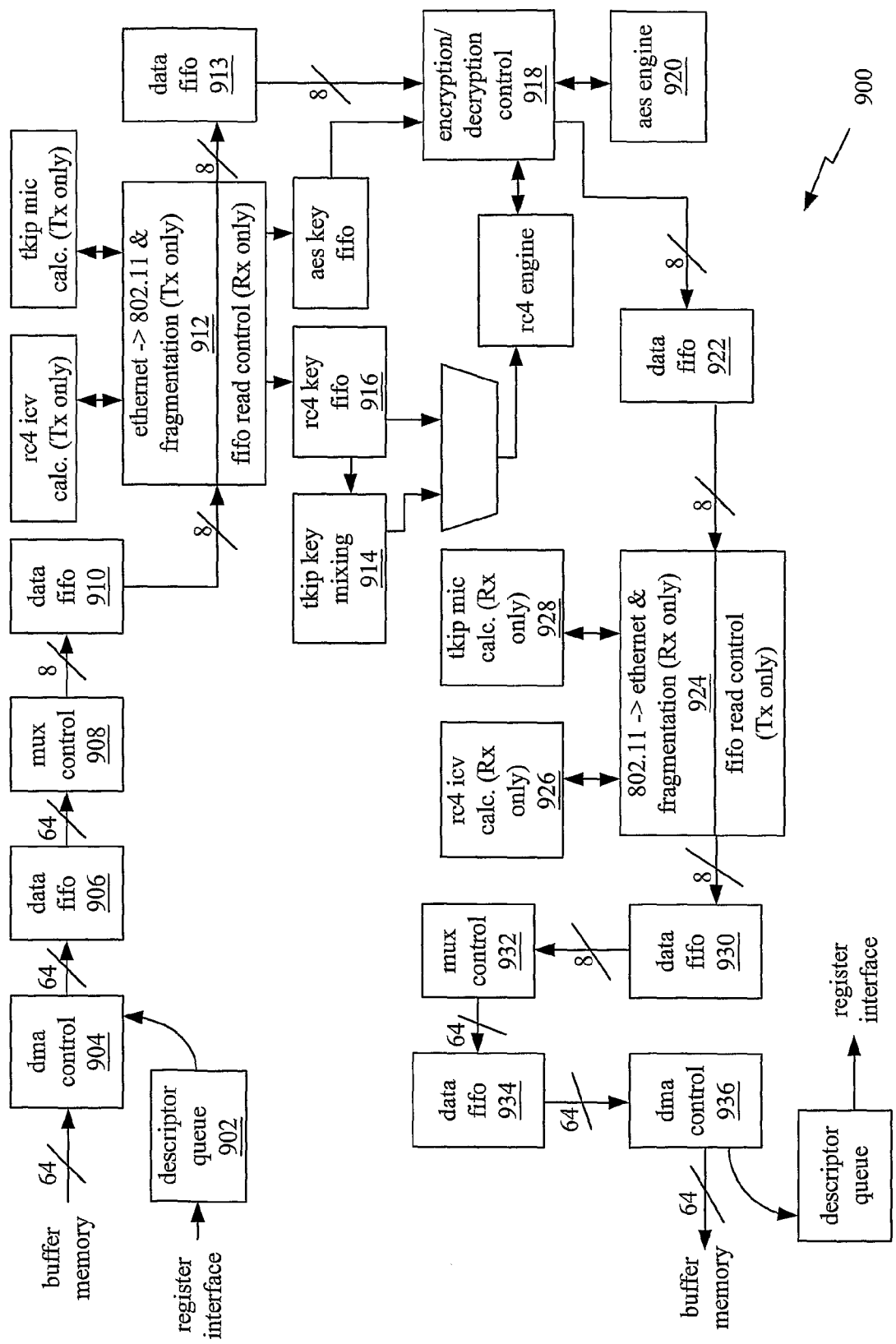
FIG. 9 is a block diagram of the frame translation engine of FIG. 8.

In FIG. 9, a block diagram 900 of the frame translation engine 814 of FIG. 8 is shown. The FTE 814 performs the functions required to translation between one protocol format to another, such as Ethernet and 802.11 frame formats. The FTE 814 translation may include MAC header translations, encryption/decryption, and MAC layer fragmentation.

An Input Descriptor Queue 902 may have a pointer to the frame data plus a descriptor that is added to this queue along with a bit that indicates if receive or transmit translation is required. This starts the translation process. The frame descriptor includes information such as frame length, encryption type, encryption keys, etc. The Input DMA Control 904 pulls a pointer from the input descriptor queue 902 and reads the frame descriptor and frame data from buffer memory and writes it into a data FIFO 906 stage that may be 64 bits wide. The mux control 908 converts the 64-bit data path to an 8-bit data path for storage in fifo 910 (MdlG). The next block, 912 performs different functions depending if the frame is intended for transmit or receive relative to the wireless medium. For a transmit frame, the MAC header translation and fragmentation 912 will occur. For each frame in data fifo 913 that requires security such as wired equivalent privacy (WEP) or Temporal Key Integrity Protocol (TKIP 914) encryption (i.e., RC4 916), an Integrity Check Value (ICV) will be calculated and appended to each fragment. For each frame that requires TKIP encryption, a Message Integrity Check (MIC) will be calculated over the entire frame and appended to the frame. For a receive frame, no frame processing occurs at this stage. For both transmit and receive frames the keys are prepared in FIFOs for WEP, TKIP, or AES encryption/decryption as required. Encryption/Decryption Control 918 encrypts/decrypts 802.11 fragments as required using WEP, TKIP, or AES encryption. For AES encryption, the AES MIC will be generated by the AES engine 920 for frames to be transmitted to the wireless medium and generated/checked for frames received from the wireless medium. The data is then passed to data fifo 922. The next block 924 performs different functions depending if the frame is intended for transmit or receive relative to the wireless medium. For a transmit frame, no processing occurs at this stage. For a receive frame, the MAC header translation and defragmentation will occur in block 924. For each fragment that was decrypted using WEP or TKIP (i.e., RC4), an ICV will be calculated 926 and checked against the ICV that was appended to the fragment. For each frame that was decrypted using TKIP, a MIC will be calculated 928 over the entire frame and checked against the MIC that was appended to the frame. That data from block 924 may then be passed to the data fifo 930.

In block 932, a demultiplexor (MdlG) (demux) control block converts the 8-bit data path to a 64-bit data path that is stored in the data fifo 934. An output DMA Control block 936 writes translated frame data to the destination buffer memory and the output descriptor queue 938 uses a pointer to the translated frame data. For frames received from the wireless medium, this queue will also indicate when an ICV or MIC error was detected in a frame or when a VLAN Tag was extracted from a frame along with the corresponding VLAN value.

Figure 10:
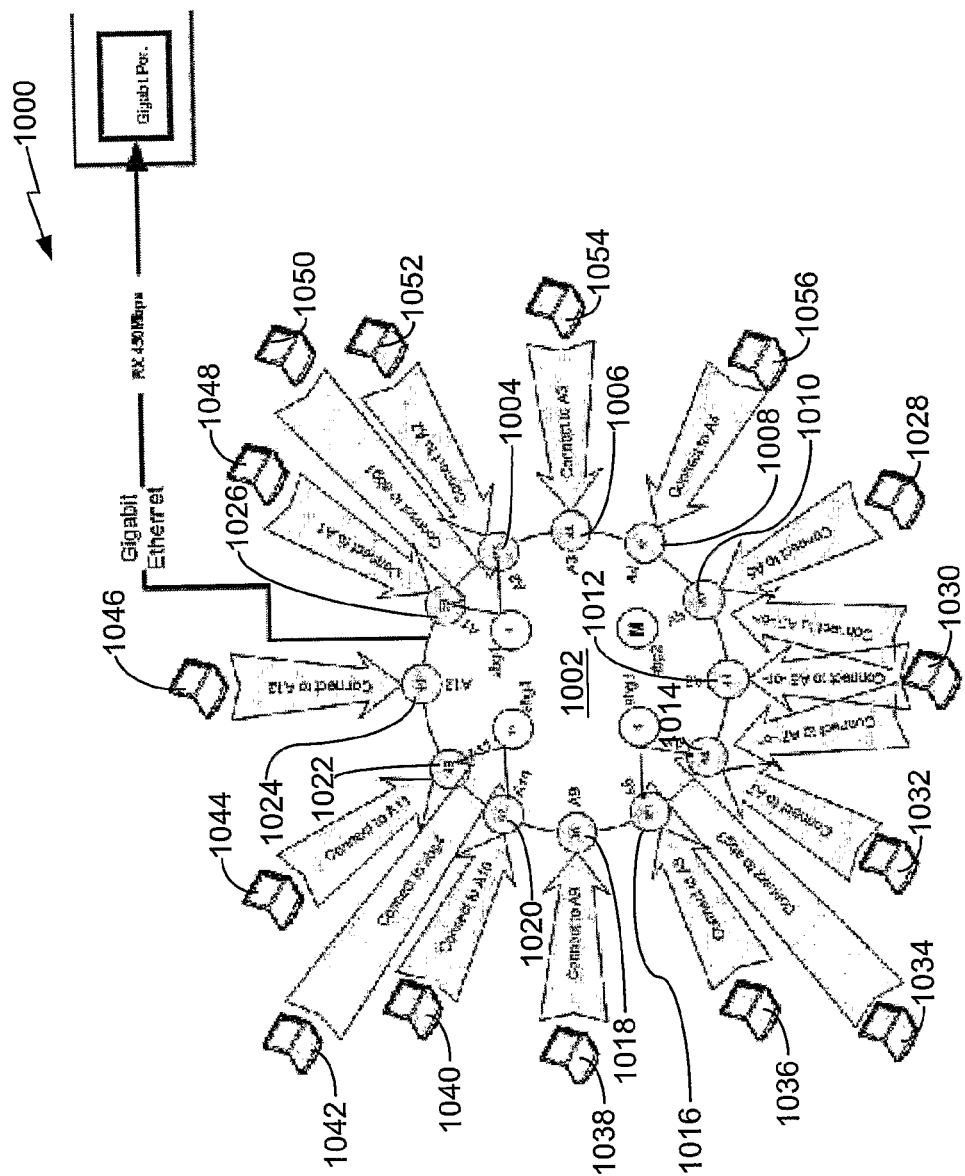
FIG. 10 is a wireless local area network (LAN) array, such as a Multi-Channel Access Point (MCAP) that may have a centralized MAC.

In FIG. 10, a wireless local area network (LAN) array, such as a Multi-Channel Access Point (MCAP) 1002 that may have a centralized MAC is shown. The MCAP 1002 is able to support multiple radios within close proximity of received signals, where close proximity means close enough to cause interference (for example next to each other). The received signals may be initially assumed to be stations (STA) 1028-1056 attempting communication with the MCAP. Based on 802.11 protocol each STA may authenticate and associate with an access point (AP) 1004-1026. As an example, the MCAP can represent "n" AP units. Where n equals the number of radios (as an example, 1-16 radios) per MCAP.

Once a STA is associated with an AP (i.e. radio) it may be in an active transmit and receive state with that AP. It is appreciated by those skilled in the art that the 802.11 protocol standards allow an AP to listen in passive mode as well. This allows radios in close proximity to "listen" to a STA that is actively associated with another AP (radio). This is an element of the Load Balance Based on Aggregate Mean Levels (LBBAME).

The MCAP as a system may keep track of all STA information in an aggregate set of data structures for all radios. There may be centralized local monitoring and control for each STA and radio. Therefore the MCAP may control all association dependencies. If a decision is taken to "move" a STA from radio 'x' to radio 'y' the directives may be initiated within the MCAP towards the STA and respective radio(s). This is also an element of the LBBAME.

The radio subsystem of the MCAP may include the centralized MAC, base band, and transceiver. There may also be other components plus standardized software. The base band and transceiver keep track of receiver signal strength (RSSI); the MCAP keeps track of channel assignments, and transmit power levels. All of these items play a role in the effectiveness between the AP (MCAP) and any given STA. This is also an element of the LBBAME.

The MCAP may listen both actively (STA associated) or passively (STA not associated) to standards based beacons and probe responses. Each radio in passive listen mode may receive data on any configured channel the radio subsystem supports. Therefore the MCAP may change the channel for time segments and "rotate" through all supported channels. While in listen mode, the MCAP may pick up probe responses, beacon responses, or any other valid 802.11 reception. Generally a likely case for passive listening would be any two adjacent radios selecting the channel that the middle radio is actively listening on.

Generally, an optional basic modem management interface (MMI) write/read function within the centralized MAC subsystem may be implemented. As an example, the system may have a limited number of bytes (such as 32) to write to location (pulled from some queue) down the MMI. And subsequently read back from the written location. This would allow the system to read back RSSI and use this in the LBBAME process. This value could be put on the front of each received frame from each STA. During passive listening the MCAP software may determine if a stronger signal is present on one of the adjacent (or even non-adjacent) radio. This would indicate that the signal is degrading on the radio that it is associated. If so this STA may be a candidate to be load balanced.

The process of load balance attempts to apply the best aggregate combination of channel number and associated radio to a particular STA. By keeping track of the RSSI per STA the system may use this in the overall LBBAME method. By having the hardware tag the frame with the RSSI the systems obtains a more real-time value of the RSSI. The software would then disassociate, via standard protocol, the STA from the radio that has the weaker RSSI to a radio with the stronger RS SI.

The design of multiple 802.11 radios in close proximity may also necessitate approaches to deal with the co-channel interference commonly referred to as adjacent channel interference (ACI) in order to reduce adjacent channel rejection (ACR). ACI is the result of RF energy from one source interfering, or "stepping", RF energy from another source. If the resulting traffic stream is distorted beyond prescribed valid recognition or remedy it is rejected. Or as termed in packet networks it is "dropped." This will result in retransmissions or missed traffic all together. This decreases throughput, capacity, and a positive user experience. Therefore the design will take this into consideration during the design phase.

The MCAP may include optionally up to sixteen (16) or more independent 802.11 radios attached to a centralized MAC. Each radio may have an individual antenna configuration. These antenna configurations may control a unique, and independent, portion (i.e., a sector) of a stated direction within a 360° range. There may be some natural and designed overlapping RF signals within these sectors, which may be noted as over lapping sectors (OLS).

The breakdown of the sixteen radios may optionally be twelve 802.11a and four 802.11g. Placement around the circumference may be one 802.11g followed by three 802.11a radios. Each radio may be within inches of the other fifteen radios. Generally, in access point placement in traditional 802.11 environments, the units are typically hundreds of meters apart. Therefore, the MCAP design introduces greater risk for ACI. So a method is needed to remove, or dilute, the amount of ACI may include using defined channels—the 802.11a has 12 (8 indoors) non-overlapping channels. 802.11g has 3 non-overlapping channels; controlling the power range—depending on the radio type and geographic region/country there is a distinct transmits power (mW) each radio can use; optimizing the packet protocol—both in layer 2 and layer 3 there are protocol definitions for data validation and flow control; using the MCAP's centralized knowledge of each client station attached to this unit; load balancing of the multiple radios; using the radio configuration to enabled, disabled, change channels, change transmit power, and toggle between receive and transmit.

Figure 11:
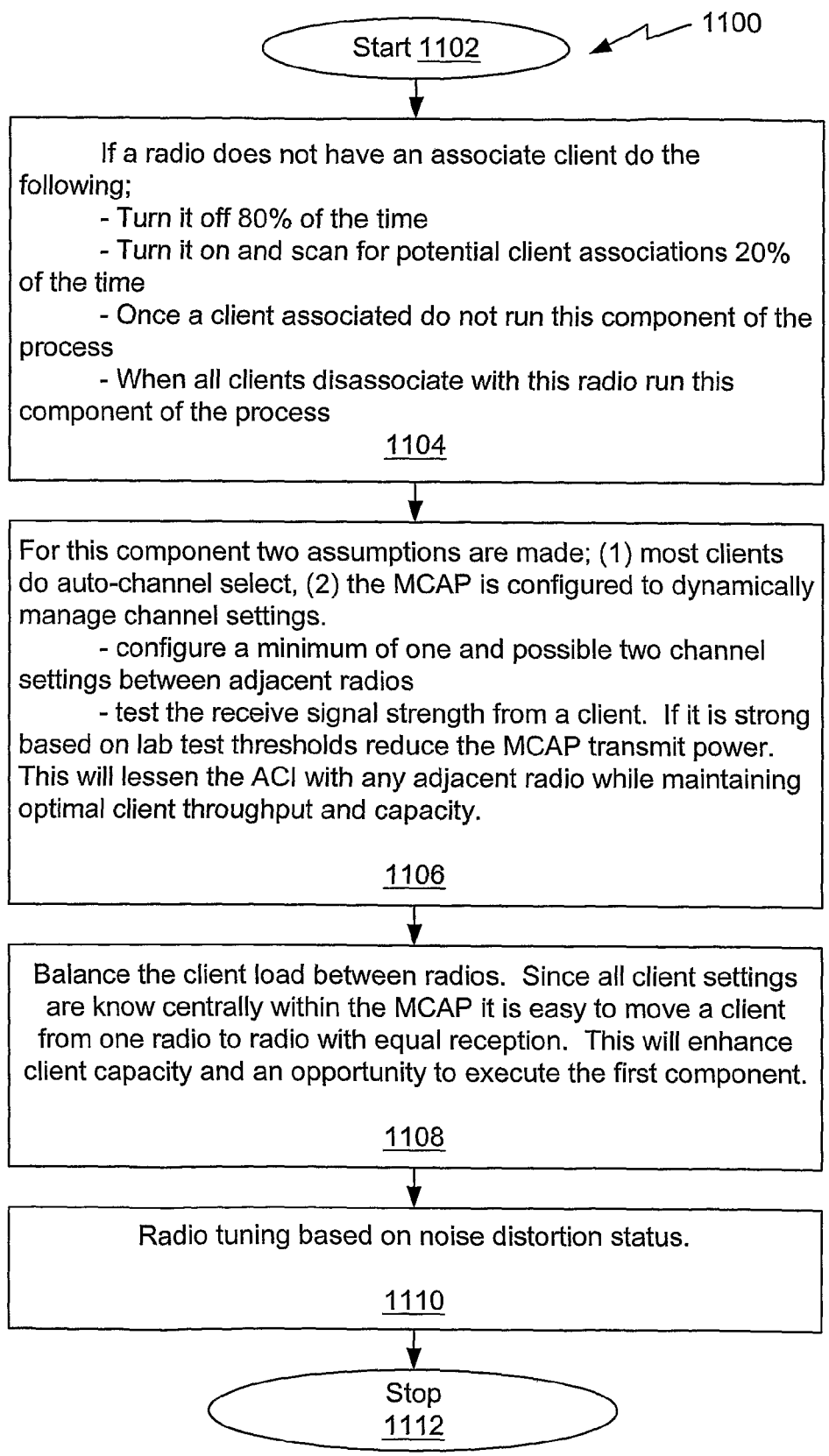
FIG. 11 is a flow diagram 1100 of an approach that will create channel separation dynamically during MCAP operations by injecting "quiet space" between active MCAP and client data paths.

Turning to FIG. 11, a flow diagram 1100 of an approach that will create channel separation dynamically during MCAP operations by inject "quiet space" between active MCAP and client data paths is shown. The flow diagram starts 1102 with a radio that does not have an associate client. In step 1104 the radio is turned off 80% of the time and turned on to scan for potential client associations 20% of the time. Once a client associated do not run this component of the process. Otherwise when all clients disassociate with this radio run this component of the process. In step 1106, most clients do auto-channel select and the MCAP is configured to dynamically manage channel settings resulting in a minimum of one and possible two channel settings between adjacent radios being configured. The signal strength from a client is tested. If it is strong based upon predetermined thresholds, the transmit power of the MCAP is reduced. This reduction in transmit power will lessen the ACI with any adjacent radio while maintaining optimal client throughput and capacity. In step 1108, a balance of the client load between radios is conducted. Since all client settings are know centrally within the MCAP it is relatively easy to move a client from one radio to another radio with equal reception. This may enhance client capacity and an opportunity to execute the first component. In step 1110, radio tuning based on noise distortion status occurs. The processes contained within the host processor or controller may be responsible for component decisions. The FPGA (or optionally the ASIC) responsibility may be to configure the radio settings based on software decisions. The system may have both preconfigured radio settings (profiles) and modified settings based on real-time radio status. These profiles could be managed by software but applied by the FPGA devices. Processing is complete at step 1112. In practice, the flow diagram may continuously repeat until a predetermined condition is reached or power is removed from the system.

As an example, Profile-1: Turn Off Radio "a, b, c"//where a, b, and c are radio numbers. Profile-2: Set Channel "Rn-c, . . . Rn-c"//R=radio, n=radio number, c=channel. Set Power "Rn-p, . . . Rn-p"//p=power setting. The controller may then decide which radio the client will be attached for data traffic.

The MCAP may determine that radios 2, 5, and 11 do not have any associated clients so it may modify profile-1 and ask the FPGA to apply it to the target radio(s). The MCAP also may notice that it now further change the channel settings so profile-2 is modified. By changing the transmit path characteristics the system may reduce ACI. All of this can be transparent to the client and system administrator. Given the close proximity of the MCAP radios the above description may lead to reduced ACI for a more efficient wireless access point product.

Being that the wireless LAN array may be a type of wireless access point housing several radios. Each radio in the array may implement the equivalent functions of an independent single radio access point and may each have an associated antenna. The radios in the array may be tuned to independent channels with no two radios in the system operating on the same channel. It is possible, however, for radios operating on adjacent channels to interact with each other and cause packet loss. One or more techniques may be employed throughout the design of the wireless LAN array to minimize the effects of the problem, which may be referred to as 'co-channel interference'. The centralized MAC module 402 in the array may implement several algorithms to reduce the co-channel interference.

In the wireless LAN environment established by the IEEE 802.11 standardization body, radios may operate in one of two frequency bands: the 2.4 GHz band and the 5 GHz band. The standard specifies multiple channels within each band (see Table 1). Channels are defined as allocations of frequency spectrum with specified center frequencies and spacing. For example, in the 2.4 GHz band there are 14 defined channels starting at a center frequency of 2.412 GHz and incrementing up to 2.484 GHz at 5 MHz intervals. Channels are considered overlapping if their bands overlap above a certain power threshold. For instance, in the 2.4 GHz region each channel operates with a frequency band of 12 MHz on either side of the center frequency. So with 14 channels defined with center frequencies 5 MHz apart, several of them are overlapping. (In fact, there are only three channels that do not overlap in the 2.4 GHz band. Their center frequencies are at 2.412 GHz, 2.437 GHz and 2.462 GHz.

Figure 12:
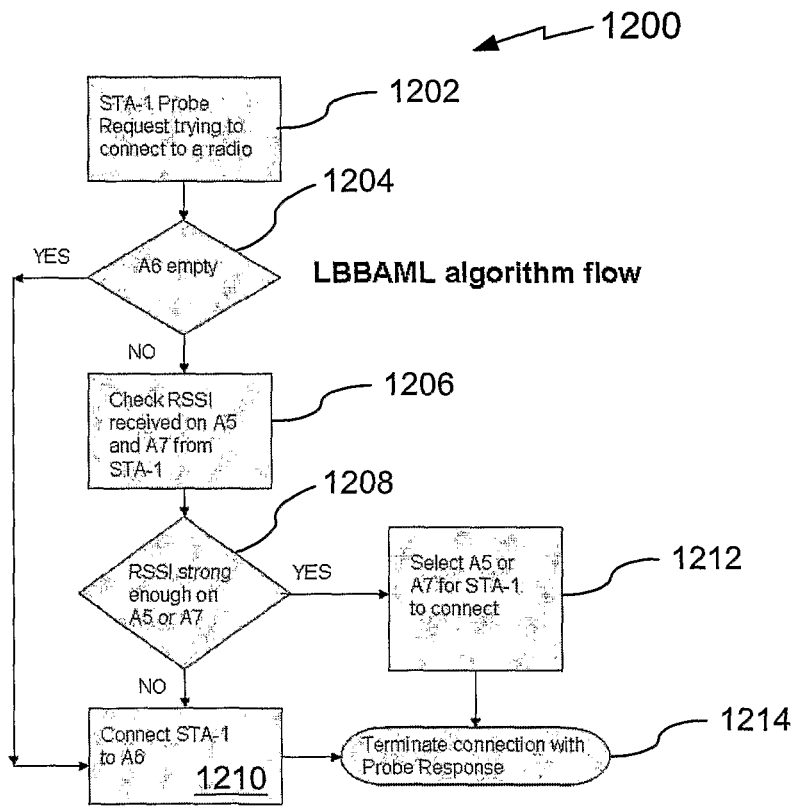
FIG. 12 is a flow diagram of an approach for load balancing within a wireless LAN array.

In FIG. 12, a flow diagram 1200 of an approach to load balancing within the wireless LAN array is shown. The flow starts with a STA-1 probe request trying to connect to a radio in step 1202. If the access point A6 is empty in decision step 1204, then a connection is made from STA-1 to A6 1210. Otherwise, a check of the received signal strength indication (RSSI) received on A5 and A7 from STA-1 is made in step 1206. If the RSSI is strong enough on A5 or A7 in decision step 1208, then A5 or A7 for STA-1 to connect is selected in step 1212 and the connection is terminated with a probe response in step 1214. Otherwise, STA-1 is connected to A6 in step 1210 and the connection is terminated with a probe response in step 1214. Thus, a transceiver or radio associated with a predetermined channel in the wireless LAN array is selected based upon characteristics or measurements (such as RSSI) of the current channel and neighboring channels.

Figure 13:
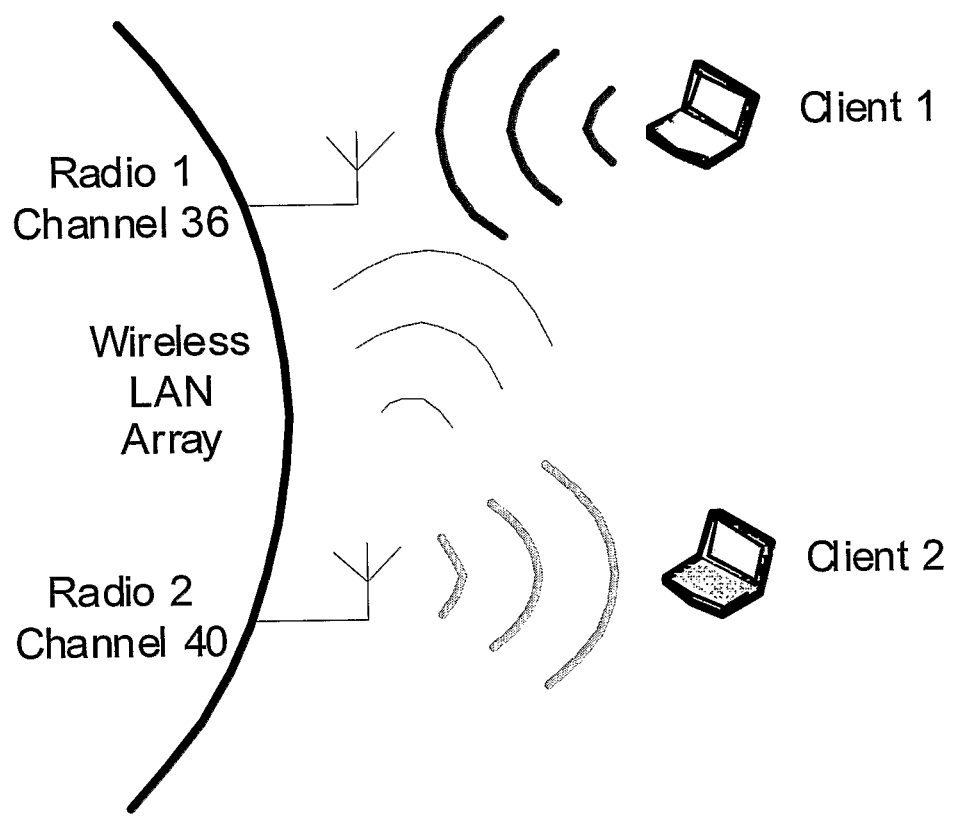
FIG. 13 is an illustration of how two radios in a wireless LAN array that are tuned to overlapping channels makes them vulnerable to co-channel interference problems.

Turning to FIG. 13, an illustration of how two radios in a wireless LAN array that are tuned to overlapping channels makes them vulnerable to co-channel interference problems is shown. Radio 1 is set to channel 36 and radio 2 is set to channel 40, both of which are defined channels in the 5 GHz band. The center frequency of channel 36 is 5.180 GHz and the center frequency of channel 40 is 5.200 GHz. The separation between the center frequencies is 20 MHz. However, the transmission spectral content of channels in the 5 GHz band is permitted by the specification to be up to 30 MHz away from the center frequency. Thus the two channels are overlapping. In FIG. 13, radio 2 is transmitting to client 2 at the same instant radio 1 is receiving from client 1. The radios are operating on their respective channels, but radio 2, in addition to transmitting clearly on channel 40 is also transmitting a fainter version of its message on channel 36. The weaker signal is detectable by radio 1 and it can corrupt reception of the signal from client 1.

TABLE 1

802.11 Radio Channel Assignments

| IEEE 802.11 A (5.0 GHz Band) | | IEEE 802.11 B/G (2.4 GHz Band) Non-Overlapping | |
|---|---|---|---|
| Channel Number | Frequency (MHz) | Channel Number | Frequency (MHz) |
| 36 | 5180 | 1 | 2412 |
| 40 | 5200 | 6 | 2437 |
| 44 | 5220 | 11 | 2462 |
| 48 | 5240 | | |
| 52 | 5260 | | |
| 56 | 5280 | | |
| 60 | 5300 | | |
| 64 | 5320 | | |
| 149 | 5745 | | |
| 153 | 5765 | | |
| 157 | 5785 | | |
| 161 | 5805 | | |

The current approach for existing access points is to avoid co-channel interference problems by not operating radios in close proximity to each other on adjacent channels. Since prior art access points have a single radio in them, co-channel interference is not possible. In the current approach with multiple radios, the multiple radios may be set to non-interfering channels. For example, an access point might have two radios with one set to the 2.4 GHz band and the other set to the 5 GHz band. Being in entirely different bands the two radios have minimal or no co-channel interference problem.

Wireless LAN arrays by design have many more radios in them. However, densely populated arrays may employ many or all of the channels defined in the bands making the use of adjacent channels unavoidable. Various techniques may be implemented in the wireless LAN array, such as the MCAP, to mitigate the resulting interference problems. This application focuses on those techniques employed in the media access controller, or MAC, to reduce the occurrences of interference situations.

In a wireless LAN array the centralized MAC controls the data transfers performed by a radio chipset onto the wireless medium. Its purpose is to implement the wireless medium data exchange protocols. The protocols include things like minimum and maximum data packet sizes, handshaking routines for data exchanges, timing parameters governing frame transmissions and special frame types for conveying medium control information. These rules enable multiple devices to access the wireless medium, which is a shared medium, with the least amount of interference. It should be noted that the rules in the standard are defined for multiples devices on a single channel. But, the standard does not address co-channel interference issues.

Figure 14:
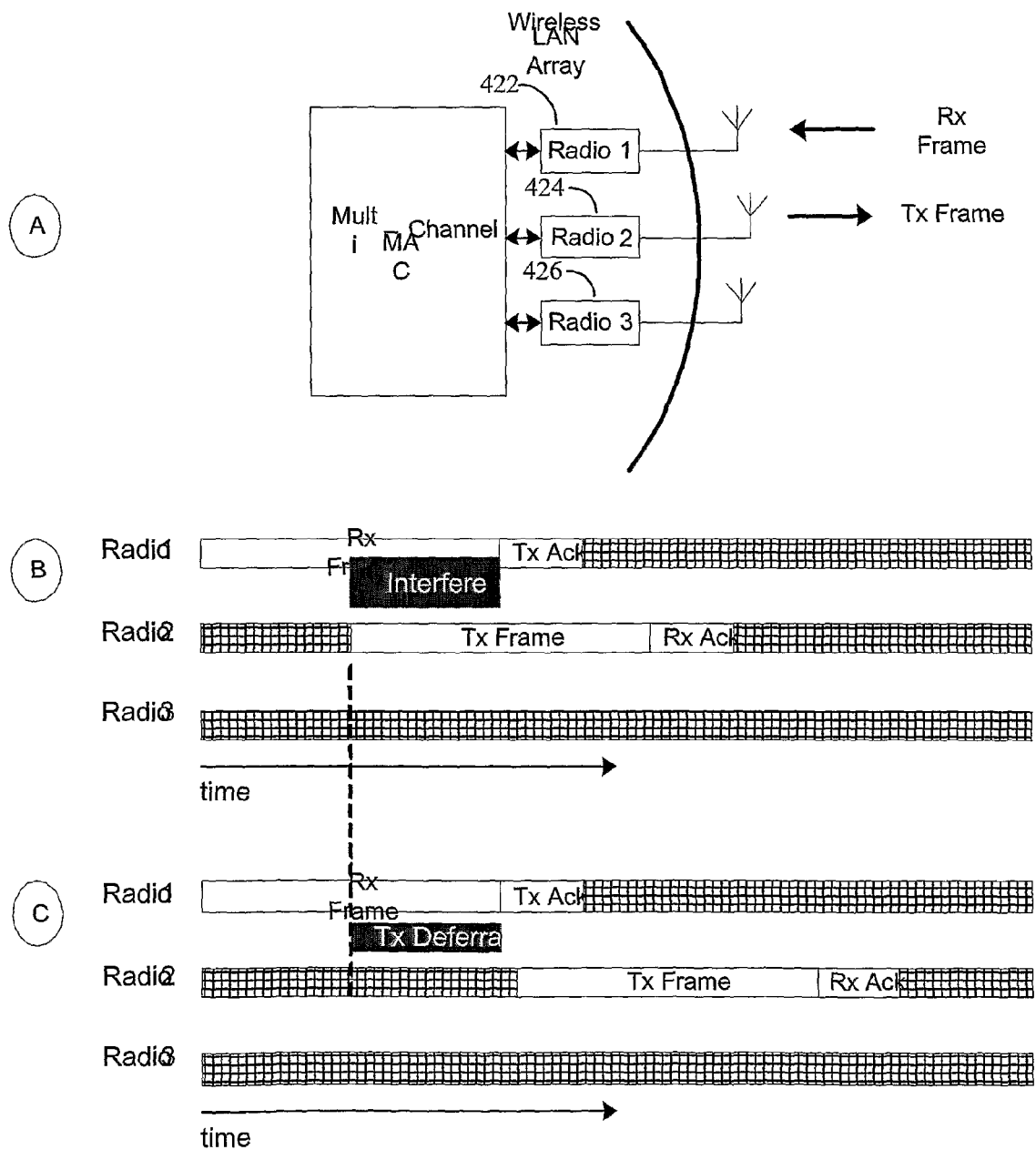
FIG. 14 is an illustration of transmission deferral approach.

In FIG. 14, an illustration of transmission deferral approach is shown. In "A" of FIG. 14, an abstract view of the wireless LAN array 400 of FIG. 4 is shown. Three radios 422, 424 and 426 are depicted. Radio two 424 is assigned a channel that is adjacent to the channel settings of both radio one 422 and radio three 426. Therefore radio two 424 is subject to co-channel interference from radios one 422 and three 426. Radios one 422 and three 426 are both subject to co-channel interference from radio two 424 but not from each other. In the figure, radio two 424 is transmitting a frame at the same time radio one 422 is receiving a frame. In "B" of FIG. 14, a timeline of the frame transactions is shown. Radio one 422 starts to receive its frame first. A short time later radio two 424 starts to transmit its frame, resulting in interference to the receive frame on radio one 422. The frame on radio one 422 is corrupted and becomes invalid.

In a wireless LAN array with a centralized MAC module 402 the centralized MAC module 402 has a 'receive busy' input from each of the radios (see FIG. 4). By making the multi-channel MAC in "A" of FIG. 14, aware that radio two interacts with radio one 422, and by monitoring the 'rx busy' line from radio one 422, it can defer transmission of the frame on radio two 424 until radio one 422 has completely received its frame. This is shown in the timeline of "C" in FIG. 14. The transactions on both radios are shown as completing successfully.

Figure 15:
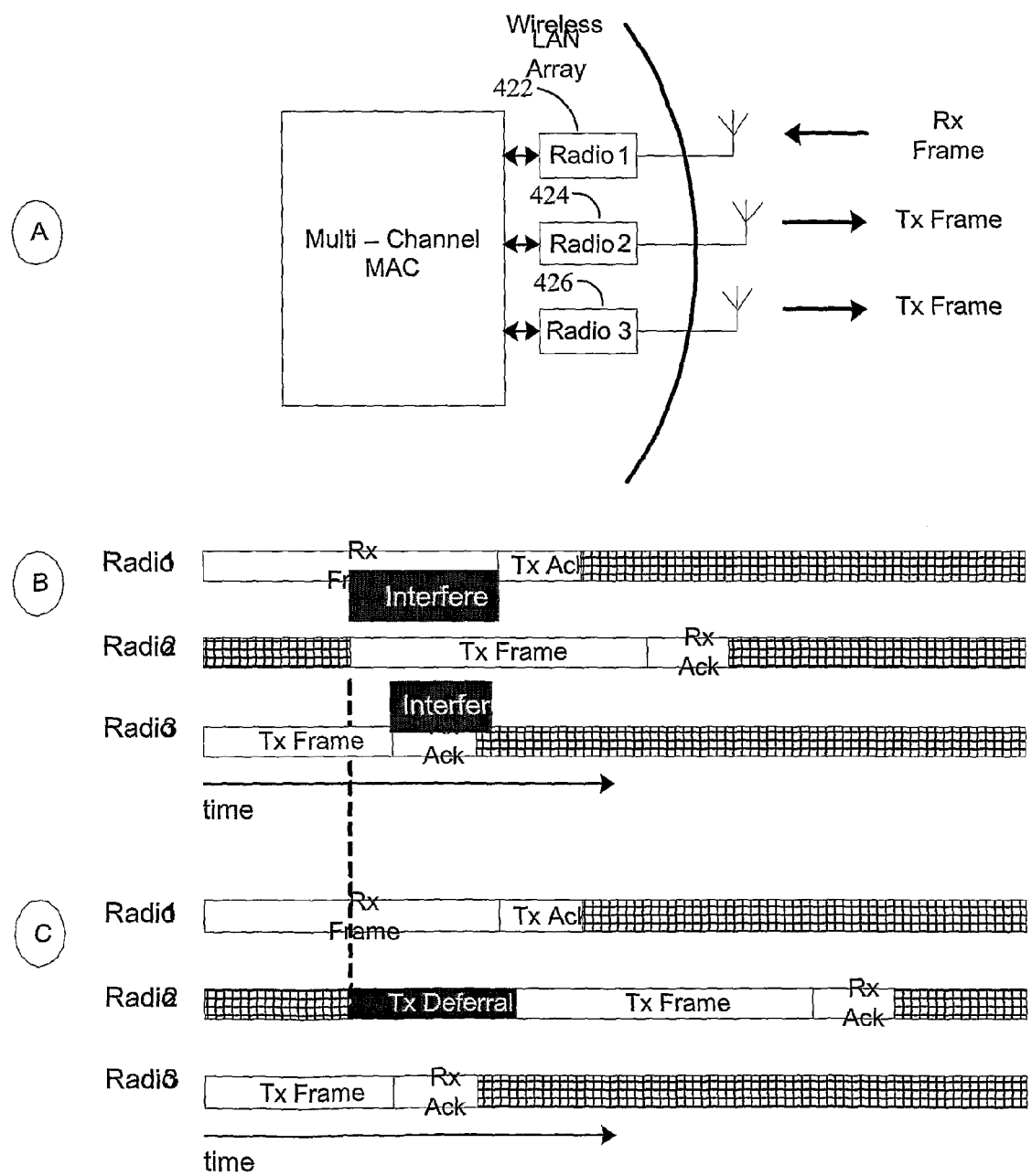
FIG. 15 is an extension of the transmission deferral approach.

Turning to FIG. 15, an extension of the transmission deferral approach is shown. As before there are three radios in the system 422, 424 and 426 and radio two 424 is tuned to an adjacent channel to both radios one and three. In this case all three radios are active. Radio one is receiving a packet while radios two 424 and three 426 are transmitting packets. Once again the transmission from radio two 424 causes interference, only this time it corrupts two packets instead of just one. Additionally, the loss on radio three 426 occurs not because a data frame was incorrectly receive but because an Acknowledgement (Ack) packet was corrupted. According to the 802.11 protocol, packet transmissions are not complete until the sender of the packet receives an Ack packet from the recipient indicating a successful transaction.

FIG. 15 illustrates two pieces of information that can be processed by the centralized MAC module 402 to make transmission deferral decisions. The first is total packet loss. If a radio interferes with only one other radio in the array, a successful transmission on that radio results in one lost packet (on the adjacent radio) and one successful packet delivery (on the transmitting radio). Such is the case in "B" of FIG. 14, where radio two 424 transmits successfully but radio one 422 loses its receive packet. However in "B" of FIG. 15, the successful transmission on radio two 424 results in the loss of two packets, one on radio one 422 and the other on radio three 426. Since the centralized MAC module 402 is aware of the transmission and receive activity of all three radios 422, 424 and 426, it can make a decision to defer a packet transmission if it may result in the loss of two packets. The second piece of information shown in FIG. 15 is the activity type on the neighboring radios. Co-channel interference corrupts the reception of packets on neighboring radios, but in "B" of FIG. 15 the packet loss is not due to corruption of the actual data packet itself. The corruption is from the loss of the Ack packet required to resolve the exchange. In this case the centralized MAC module 402 may decide to defer transmission, not because of a current conflict but because of an anticipated conflict. The transmission of the packet is therefore deferred until the successful reception of the Ack packet on radio three 426.

Several techniques may be included in an approach to minimize co-channel interference based on transmission deferral. The techniques may include:
1) TX Frustration Threshold
2) RX Frustration Threshold
3) Combined Tx and Rx Frustration Thresholds
4) TX Ack Deferral
5) Transmission Synchronization.

Figure 16:
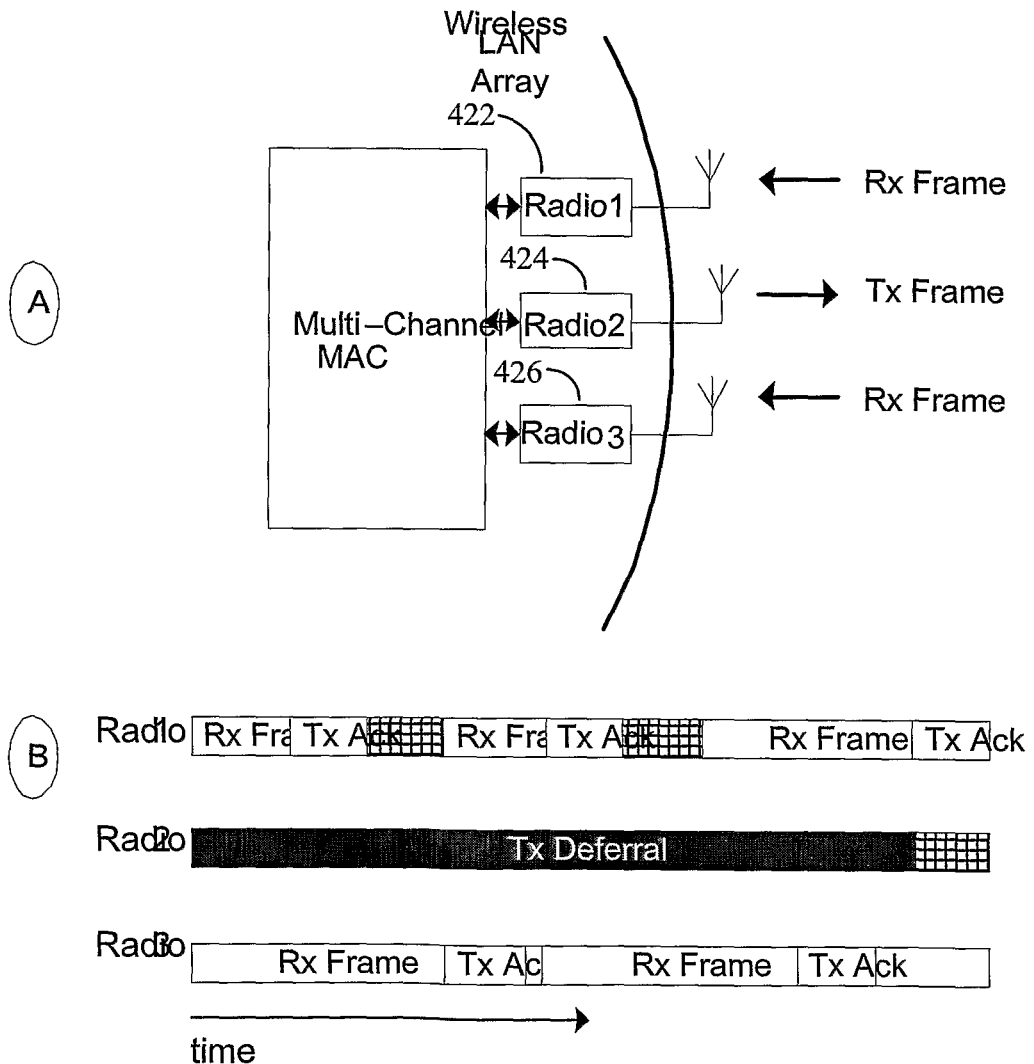
FIG. 16 is a diagram of the lockout condition due to the asynchronous nature of data traffic on the wireless medium.

Transmission Frustration Threshold approach is demonstrated when a radio that is deferring transmissions based on the activity of its neighbors falls into a lockout condition. The lockout condition may be due to the asynchronous nature of data traffic on the wireless medium. This is illustrated in FIG. 16. Once again radio two 424 is tuned to a channel immediately adjacent to radios one 422 and three 426. Radio two 424 is attempting to transmit a packet while radios one 422 and three 424 are receiving multiple packets. As shown in B of FIG. 16, the asynchronous, alternating receive packets on radios one 422 and three 426 cause radio two 424 to defer continuously.

To avoid this condition the centralized MAC module 402 may define and track states for each radio that has a frame to transmit. These states are referred to as the Transmission Frustration levels and are used to help balance transmission deferral time with receive packet corruption on neighboring radios. Transmission deferral algorithms may then be constructed based on the frustration state of a radio and the current activity of its co-channel neighbors.

Figure 17:
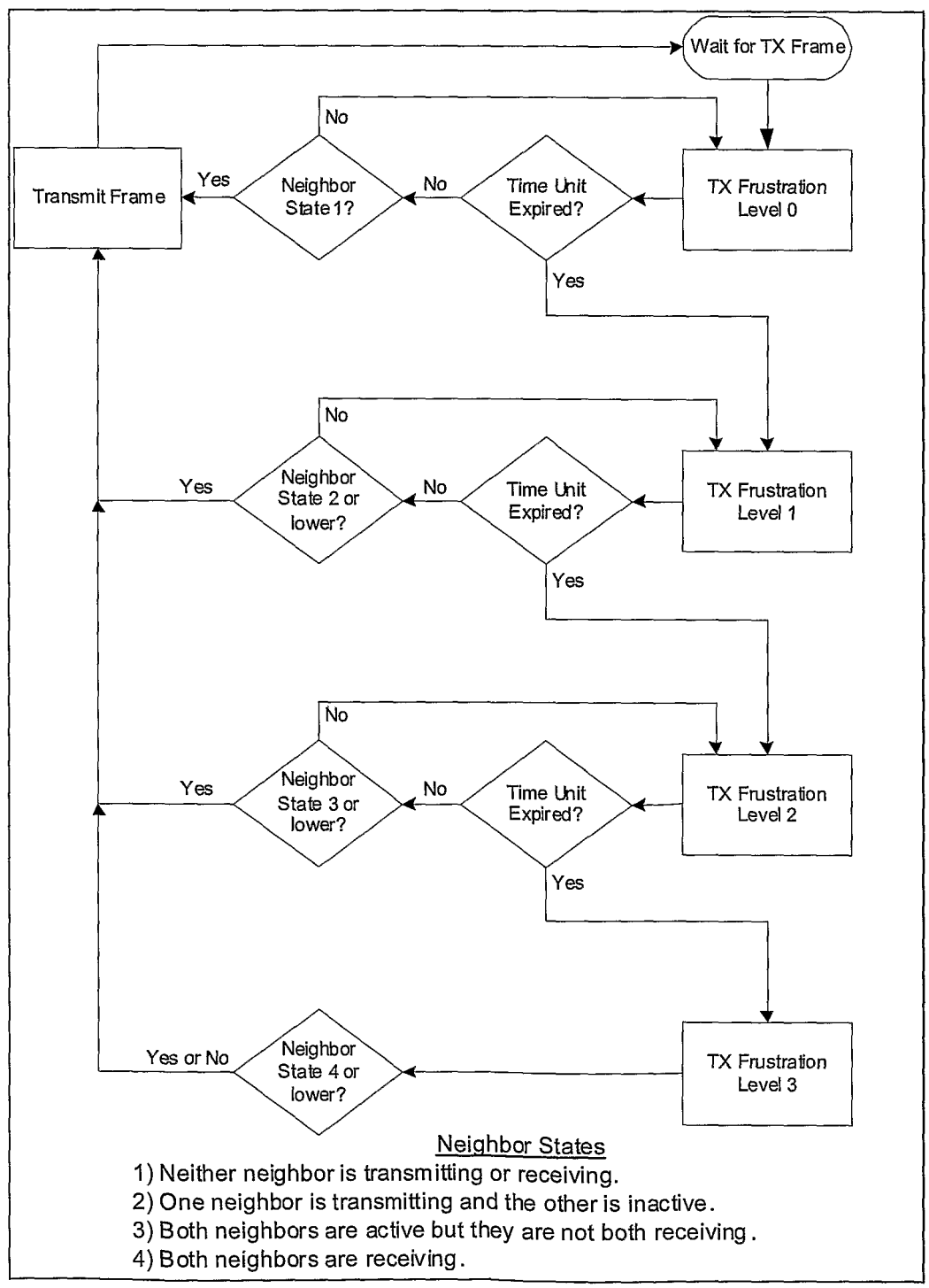
FIG. 17 is a flow diagram of a MAC algorithm executed use by the centralized MAC module of FIG. 4 for determining transmission deferral on radio two in "A" of FIG. 16.
Figure 18:
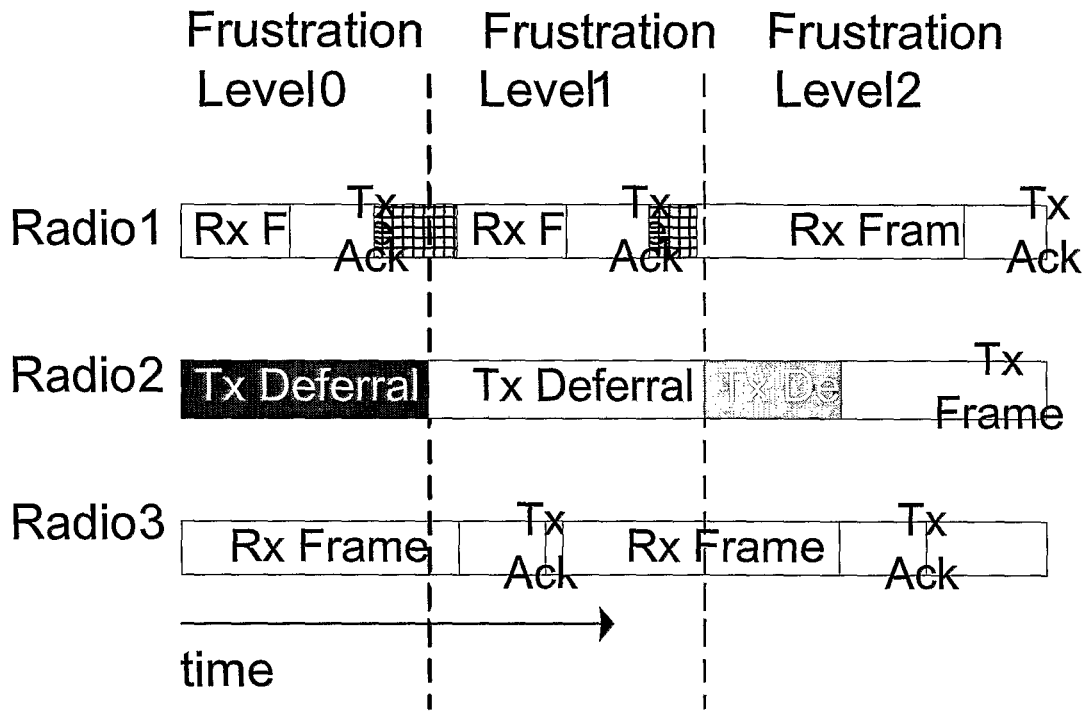
FIG. 18 illustrates that both radios are indeed receiving when radio two moves to frustration level two, but before the time unit expires radio one switches to an Ack transmission.

Turning to FIG. 17, a flow diagram of a MAC algorithm executed by the centralized MAC module 402 of FIG. 4 for determining transmission deferral on radio two in "A" of FIG. 16 is shown. The flow diagram starts when radio two 422 receives a transmit frame. Its frustration level is set to zero and a timer is started to count down duration 'Time Unit'. To transmit the frame, the centralized MAC module 402 must check the activity state of its two neighbors (radios one 422 and three 426) and see that it passes a restrictive condition. "B" of FIG. 16 is repeated in FIG. 19 but altered to show the Transmission Frustration algorithm. The Neighbor States are defined at the bottom of the figure. While at frustration level zero the centralized MAC module 402 can allow transmission only while neither neighbor is active. There is no instant during the initial time unit where that condition holds and eventually the interval expires and radio two moves to frustration level one. While at frustration level one the centralized MAC module 402 allows radio two to transmit only if one neighbor is transmitting and the other is inactive. Throughout all of the frustration level one time unit there is always at least one of the neighbors receiving a frame, so once again the condition does not match and the interval expires. Radio two then transitions to frustration level two. Now the centralized MAC module 402 may allow the frame to be transmitted if both radios are busy but not both receiving. FIG. 18 shows that both radios are indeed receiving when radio two 424 moves to frustration level two, but before the time unit expires radio one 422 switches to an Ack transmission. The transmit condition is met at that point and the centralized MAC allows radio two 424 to transmit its frame.

In general, the centralized MAC module's transmission restrictions on any radio are reduced as that radio's transmission frustration threshold rises. Various permutations to the algorithm may be made in other implementations by changing the number of Frustration Levels, the definitions of the Neighbor States and the Time Unit values.

Figure 19:
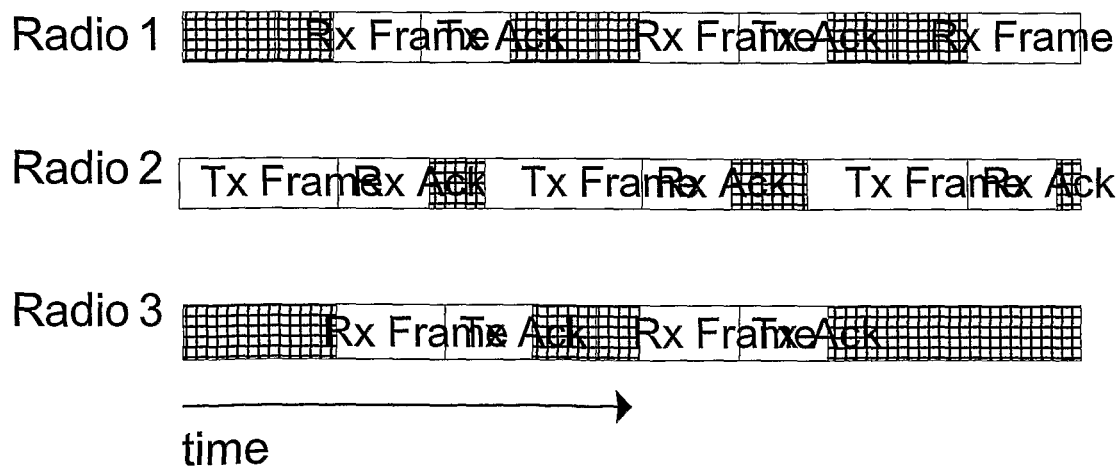
FIG. 19 is another timing diagram based on the radio conditions in "A" of FIG. 16.

The receive frustration threshold approach is similar to the way a radio's neighbors' activity can force a transmission lock out condition, a radio's transmission activity can cause a receive lock out condition on its neighbors. The point is illustrated in FIG. 19, which is another timing diagram based on the radio conditions in "A" of FIG. 16. In this scenario, radio two initiates a transmission while radios one and three are idle. Shortly thereafter frames are sent to both radio one and radio three, but they are partially overlapping with radio two's transmission. As a result, the receive frames on both radios one and three are corrupted by co-channel interference. Radio two transmits two more frames with similar corruption occurring on radio one and three receive frames.

To help alleviate this problem the centralized MAC module 402 may track Receive Frustration levels on each of the radios to help determine when to defer frame transmissions. Receive Frustration can be adjusted by either a timer set to measure a maximum interval between valid receive frames or by a count of the number of invalid frames detected by the centralized MAC module 402. Invalid frames can be defined as frames with an incorrect frame check sequence (FCS), which is likely to occur when co-channel interference is present.

Figure 20:
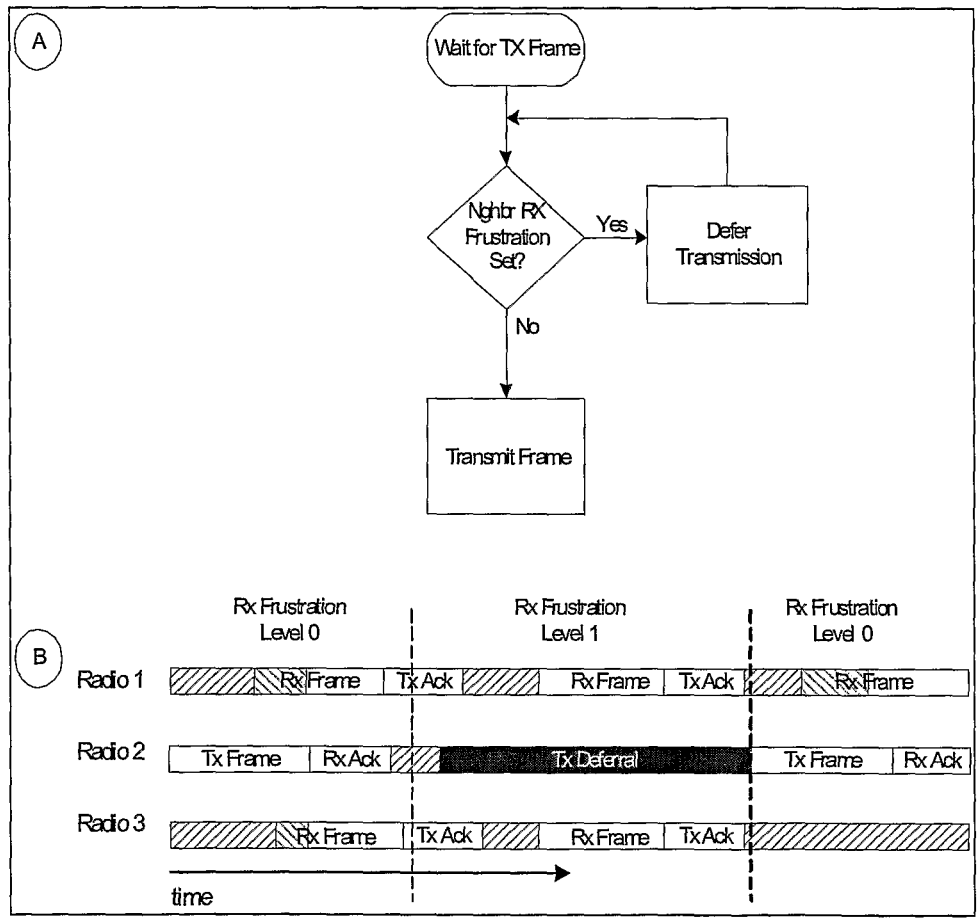
FIG. 20 depicts a simple receive frustration algorithm utilizing two levels of receive frustration. Level zero indicates that a radio's receiver is satisfied and level one indicates that a radio's receiver is distressed.

In "A" of FIG. 20, a simple receive frustration algorithm utilizing two levels of receive frustration is depicted. Level zero indicates that radio's receiver is satisfied and level one indicates that a radio's receiver is distressed. In this simple example the definition of a receiver in distress is that the last frame received had an invalid FCS, which is a possible indication that co-channel interference corrupted the frame. In "B" of FIG. 20, the resulting modified operation of the timeline from FIG. 19 is shown. As before, radio two's frame transmission results in corruption of the receive frames on radios one 422 and three 426. This time, though, radios one 422 and three 426 both raise their receive frustration level to one indicating that they've lost a frame. When radio two 424 gets its next transmission frame, the MAC sees that its neighbors have elevated their receive frustration levels and defers the frame transmission on radio two 424. Once radios one and three receive a valid frame they drop their receive frustration levels back to zero and the MAC permits radio two 424 to transmit its frame.

The Receive Frustration algorithm may be modified in multiple ways for system optimization. Additional frustration levels may be added and timers may be utilized to transition between some or all of the frustration levels. The number of FCS errors required to transition between frustration levels can be adjusted as well. Also, the decision to defer frame transmission on a radio can be tied to one or both of the neighbor radios' receive frustration level.

Figure 21:
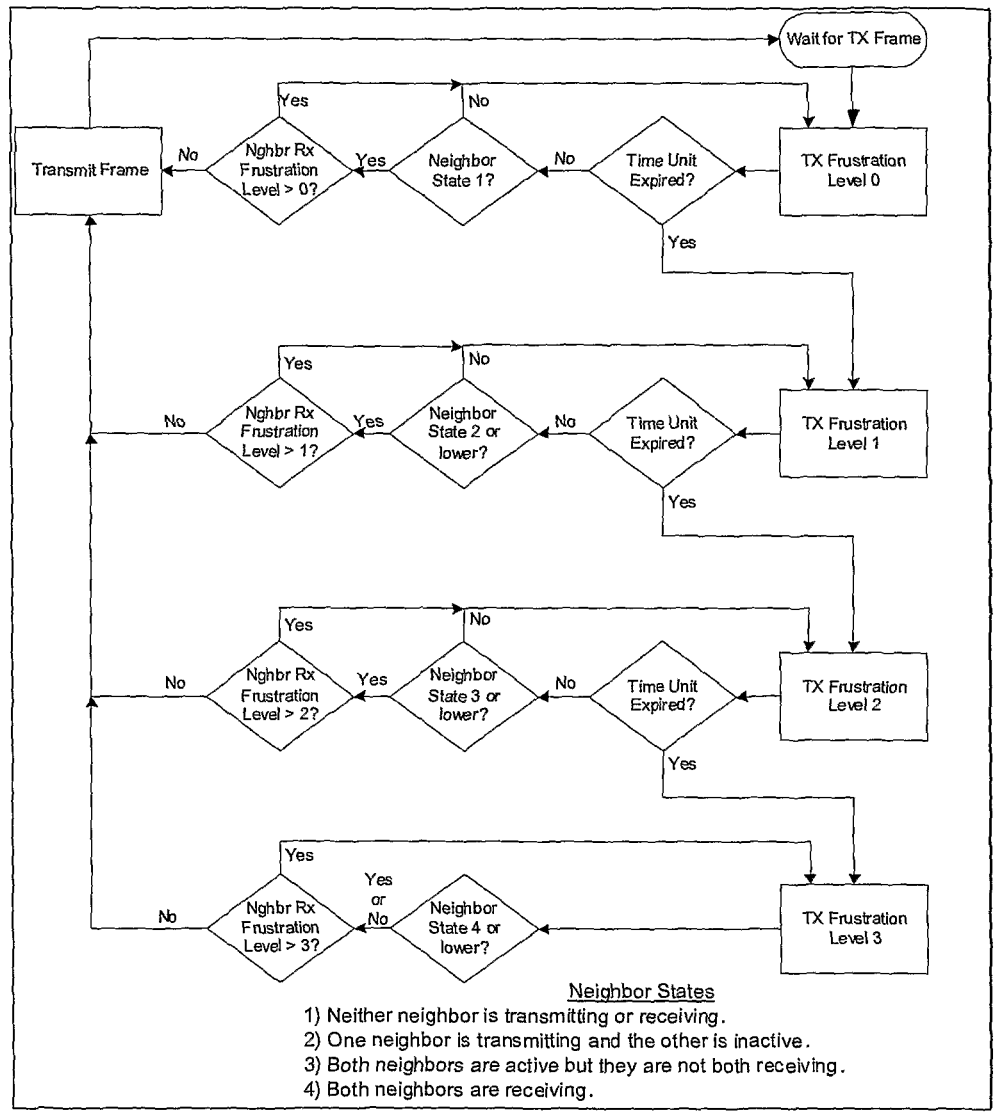
FIG. 21 is an illustration of one possible construction for the combining of transmission frustration and receive frustration thresholds.

The combining transmission frustration and receive frustration thresholds approach allows the development of more complex transmission deferral algorithms. In FIG. 21, one possible construction is shown. Multiple receive frustration levels are utilized with transition to higher levels occurring on some combination of receive FCS errors and time durations. The centralized MAC module 402 checks a radio's transmission frustration and its neighbors' activity states as described previously before allowing a frame to be transmitted, but it also checks the neighbors receive frustration levels. If they are higher than its own transmission frustration level it means that the neighbors are closer to a receive lockout condition than the transmitting radio is to a transmission lockout condition. The centralized MAC module 402 therefore defers the frame transmission a little longer until either the receive frustration declines or the transmission frustration elevates.

Another variation of transmission deferral approach is the Ack Transmission Deferral approach. In this approach the centralized MAC module 402 to defer transmission of just the acknowledgment packets. With this technique the centralized MAC module 402 decides whether to transmit Ack packets on a radio based on the receive activity of the neighboring radios. Ack packets are required to complete data frame transactions and if the sender does not receive them it will retry packets until it is successful. Retried packets are costly in terms of the medium's bandwidth, so completing the transaction quickly increases the overall throughput. Transmitting an Ack, however, can cause packet corruption on neighboring radios. If a radio transmits its acknowledgment while both its neighboring radios are receiving frames, transaction is completed at the cost of corrupting two other transactions (see "B" FIG. 16). This results in a net packet loss to the WLAN array.

Figure 22:
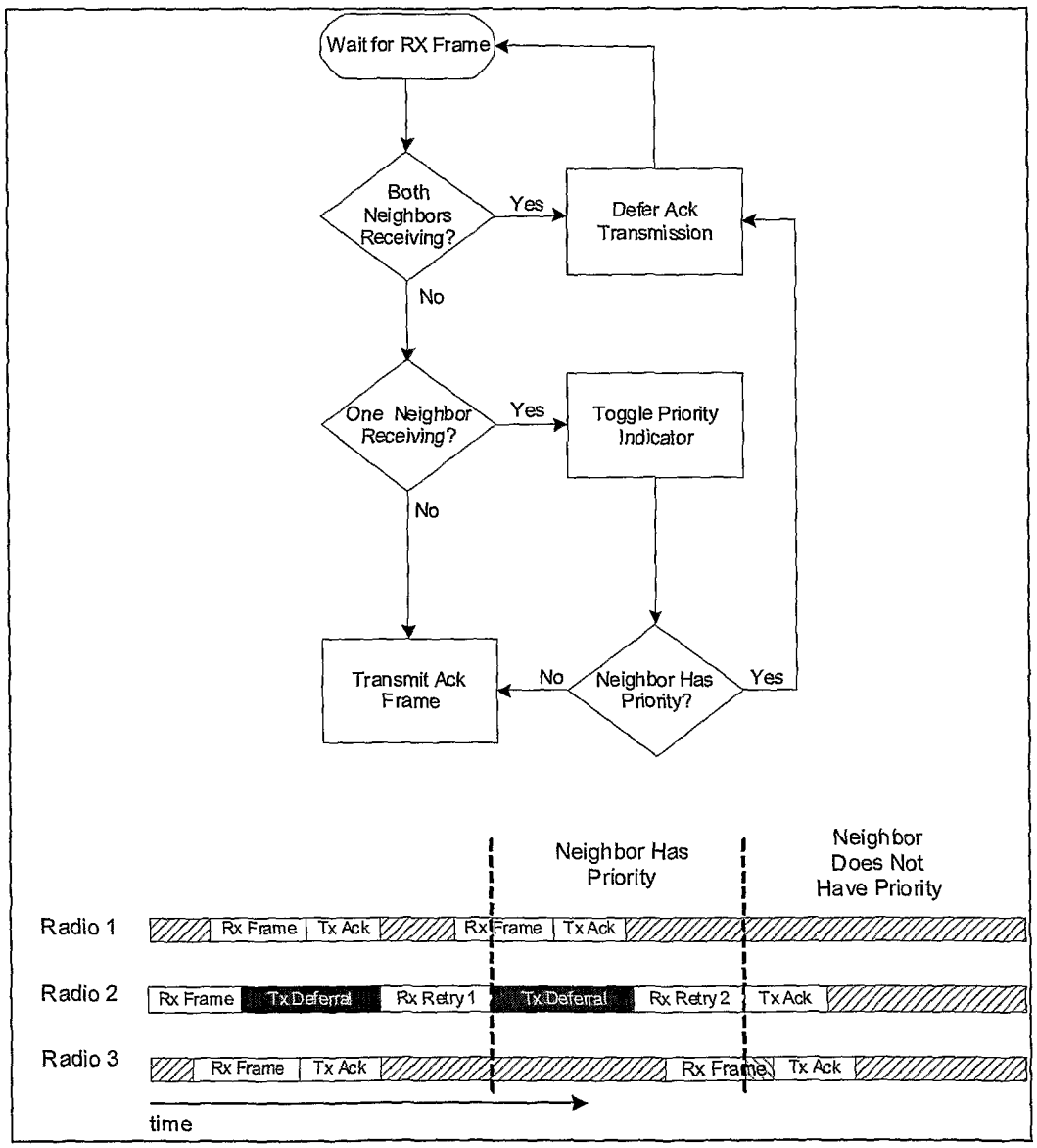
FIG. 22 is an illustration of example of an Ack transmission deferral algorithm.

In "A" of FIG. 22, a possible Ack transmission deferral algorithm is shown. When a radio receives a frame and is ready to send its acknowledgement packet the centralized MAC module 402 first checks its two neighbors. If both of them are currently receiving a frame then the centralized MAC module 402 defers transmission of the Ack. This is shown in the first part of "B" in FIG. 22. If a radio receives a packet and is ready to send its Ack but only one of the neighbors is receiving a frame then at least one packet is destined to be lost regardless of whether the Ack is sent. That is, if the radio sends its Ack then the neighbor radio will lose its packet but if the radio does not send its Ack then it will lose its own packet. To arbitrate this condition the algorithm maintains an indicator that points to either the radio itself or to its neighbor. The indicator is toggled whenever an Ack is to be sent on the radio while one of its neighbors is receiving. If the indicator points to the neighbor then the neighbor has priority and the Ack is deferred. Otherwise if the indicator points to the radio then it has priority and it sends the Ack at the neighbor's expense. Each of these scenarios is shown in the latter portion of "B" in FIG. 22.

Figure 23:
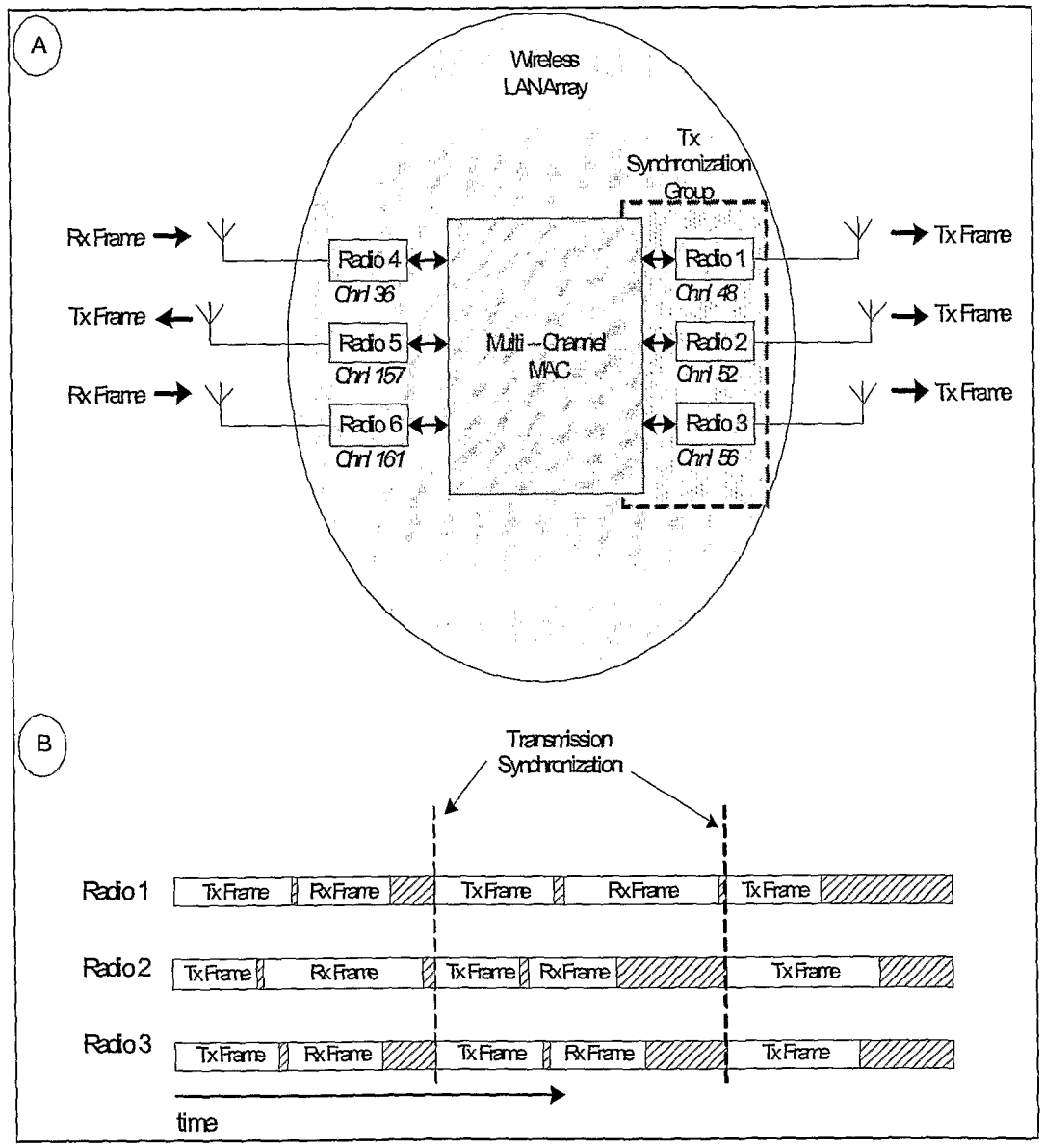
FIG. 23 is an illustration of a transmission synchronization approach.

In FIG. 23, a transmission synchronization approach is shown. This is another method by which the centralized MAC module 402 can reduce the effects of co-channel interference. Transmission Synchronization synchronizes transmissions of radios on adjacent channels. With this approach, two or more radios may be combined into a single group by the centralized MAC module 402. The radios in a group are set to a progression of adjacent channels as shown in "A" of FIG. 23. Since co-channel interference occurs when a radio is transmitting while its neighbor radio is receiving and vice versa, the centralized MAC module 402 coordinates traffic of all the radios in the group so that they are all transmitting at the same time. This is shown in "B" of FIG. 23. Transmission synchronization has the effect of synchronizing the reception of traffic in the group as well because the clients attached to each radio must wait for the medium to be clear before sending their packets to the Wireless LAN Array.

Other radios in the WLAN Array that are not part of the synchronization group can still operate independently. This can be seen in "A" of FIG. 23 for radios four, five and six. All three are assigned to channels that don't interfere with the synchronization group. Two of them, however, are assigned to neighboring channels. The centralized MAC module 402 may employ the other transmission deferral techniques to them independently from the transmission synchronization group.

Closer examination of the frame pattern in "B" of FIG. 23 reveals that even though frame transmissions are synchronized within the group there are still times when frames are being received on radio two 424 while frames are being transmitted on radios one 422 and three 426. This is because a client attached to radio two 424 is free to use the medium as soon as it becomes available. It immediately sends its packet while transmission packets are still coming out of radios one 422 and three 424.

Figure 24:
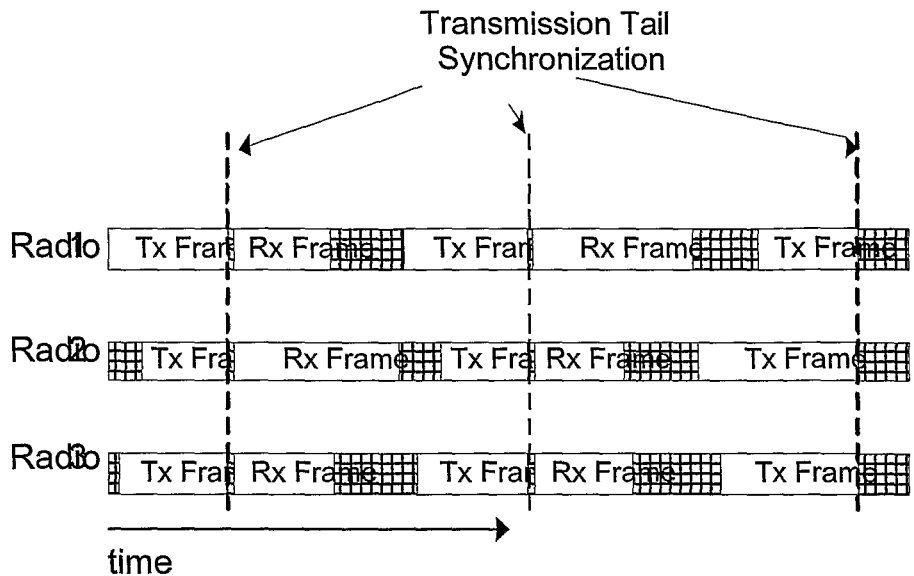
FIG. 24 is an illustration of a modification to frame synchronization that addresses the previous problem by synchronizing the tails of transmission frames instead of the beginnings.

In FIG. 24, a modification to frame synchronization that addresses the problem by synchronizing the tails of transmission frames instead of the beginnings is shown. Transmission tail synchronization aligns the ends of all the frame transmissions in the synchronization group, but it can create yet another problem. The amount of time required to wait until the next synchronized frame transmission depends on the length of the longest frame being received by the group. If one of the radios in the group is receiving a long frame but another is receiving a short frame there can be enough idle time on the medium for the short frame to be followed by another receive frame. The scenario is shown in "A" of FIG. 25. Radio three receives a short frame immediately after the group transmission while radio two receives a long frame. While radio two is still receiving the short frame, the receive frame on radio three completes and is immediately followed by another frame. A staggered pattern of receive frames prevents the centralized MAC module 402 from initiating the next group transmission.

The problem may be resolved by using a specialized frame called CTS-to-Self (or self-CTS). The self-CTS frame is normally used in mixed 802.11 B and G environments where legacy B radios are unable to 'hear' newer G radios on the same channel (due to different modulation schemes and data rates). The self-CTS frame is sent with the legacy B characteristics that can be understood by both B and G clients and it instructs all clients to stay off the medium for a specified period of time. While the medium is temporarily reserved, G clients can transfer data without the B clients interfering.

Figure 25:
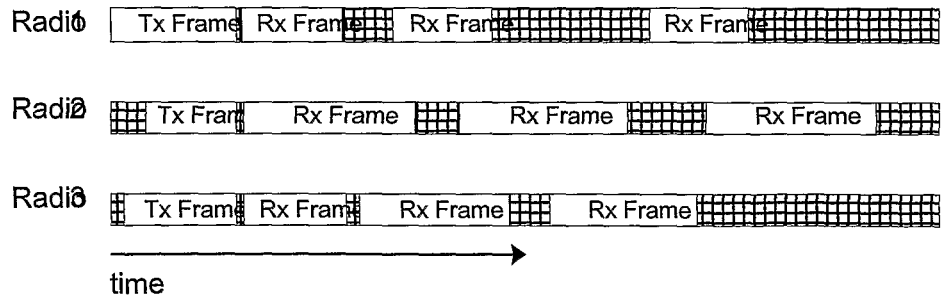
FIG. 25 illustrates a scenario wherein one of the radios in the group receives a long frame but another is receiving a short frame where there can be enough idle time on the medium for the short frame to be followed by another receive frame.
Figure 25:
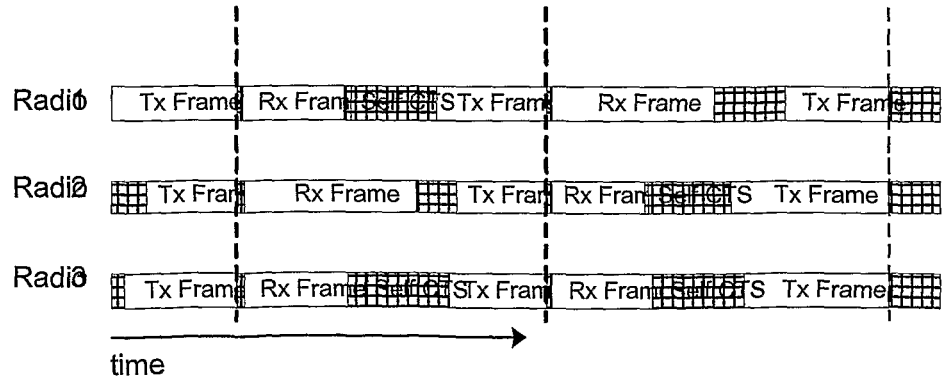

Use of the self-CTS frame is not restricted by the specifications, so the centralized MAC module 402 may apply it in this case to perform a similar function. In "B" of FIG. 25, shows how this Channel Reservation technique may be used. When the short frames are finished on radios one 422 and three 426, the centralized MAC module 402 sends a self-CTS frame on each of them. The self-CTS frames reserve their channels long enough for the frame coming in on radio two 424 to complete. Once radio two 424 is done, the centralized MAC module 402 can initiate another group transmission. All of the capabilities of co-channel interference reduction as described occurring in the centralized MAC, may in other embodiments be implemented outside of the centralized MAC or in other implementations a combination of algorithms being used inside and outside of the centralized MAC for co-channel interference reduction may be used.

Persons skilled in the art will understand and appreciate, that one or more processes, sub-processes, or process steps described may be performed by hardware and/or software. Additionally, a controller within the MCAP may be implemented completely in software that would be executed within a microprocessor, general purpose processor, combination of processors, digital signal processor ("DSP"), and/or application specific integrated circuit ("ASIC"). If the process is performed by software, the software may reside in software memory in the controller. The software in software memory may include an ordered listing of executable instructions for implementing logical functions (i.e., "logic" that may be implemented either in digital form such as digital circuitry or source code or in analog form such as analog circuitry or an analog source such an analog electrical, sound or video signal), and may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "computer-readable medium" and/or "signal-bearing medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specific examples, but nonetheless a non-exhaustive list, of computer-readable media would include the following: an electrical connection (electronic) having one or more wires; a portable computer diskette (magnetic); a RAM (electronic); a read-only memory "ROM" (electronic); an erasable programmable read-only memory (EPROM or Flash memory) (electronic); an optical fiber (optical); and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Persons skilled in the art will understand and appreciate, that one or more processes, sub-processes, or process steps described may be performed by hardware and/or software. Additionally, a controller within the MCAP may be implemented completely in software that would be executed within a microprocessor, general purpose processor, combination of processors, digital signal processor ("DSP"), and/or application specific integrated circuit ("ASIC"). If the process is performed by software, the software may reside in software memory in the controller. The software in software memory may include an ordered listing of executable instructions for implementing logical functions (i.e., "logic" that may be implemented either in digital form such as digital circuitry or source code or in analog form such as analog circuitry or an analog source such an analog electrical, sound or video signal), and may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "computer-readable medium" and/or "signal-bearing medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specific examples, but nonetheless a non-exhaustive list, of computer-readable media would include the following: an electrical connection (electronic) having one or more wires; a portable computer diskette (magnetic); a RAM (electronic); a read-only memory "ROM" (electronic); an erasable programmable read-only memory (EPROM or Flash memory) (electronic); an optical fiber (optical); and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It is appreciated by those skilled in the art that the flow diagram shown in FIG. 11 along with other procedures and logical determinations discussed previously may selectively be implemented in hardware, software, or a combination of hardware and software. An embodiment of the process steps employs at least one machine-readable signal bearing medium. Examples of machine-readable signal bearing mediums include computer-readable mediums such as a magnetic storage medium (i.e. floppy disks, or optical storage such as compact disk (CD) or digital video disk (DVD)), a biological storage medium, or an atomic storage medium, a discrete logic circuit(s) having logic gates for implementing logic functions upon data signals, an application specific integrated circuit having appropriate logic gates, a programmable gate array(s) (PGA), a field programmable gate array (FPGA), a random access memory device (RAM), read only memory device (ROM), electronic programmable random access memory (EPROM), or equivalent. Note that the computer-readable medium could even be paper or another suitable medium, upon which the computer instruction is printed, as the program can be electronically captured, via for instance optical scanning of the paper or other medium, then compiled, interpreted or otherwise processed in a suitable manner if necessary, and then stored in a computer memory.

Additionally, machine-readable signal bearing medium includes computer-readable signal bearing mediums. Computer-readable signal bearing mediums have a modulated carrier signal transmitted over one or more wire based, wireless or fiber optic networks or within a system. For example, one or more wire based, wireless or fiber optic network, such as the telephone network, a local area network, the Internet, or a wireless network having a component of a computer-readable signal residing or passing through the network. The computer readable signal is a representation of one or more machine instructions written in or implemented with any number of programming languages.

Furthermore, the multiple process steps implemented with a programming language, which comprises an ordered listing of executable instructions for implementing logical functions, can be embodied in any machine-readable signal bearing medium for use by or in connection with an instruction execution system, apparatus, or device, such as a computer-based system, controller-containing system having a processor or controller, such as a microprocessor, digital signal processor, discrete logic circuit functioning as a controller, or other system that can fetch the instructions from the instruction execution system, apparatus, or device and execute the instructions.

The foregoing description of an implementation has been presented for purposes of illustration and description. It is not exhaustive and does not limit the claimed inventions to the precise form disclosed. Modifications and variations are possible in light of the above description or may be acquired from practicing the invention. For example, the described implementation includes software but the invention may be implemented as a combination of hardware and software or in hardware alone. Note also that the implementation may vary between systems. The claims and their equivalents define the scope of the invention.

What is claimed is:

1. A wireless access point, comprising:
a plurality of transceivers configured to communicate over wireless medium with at least one mobile station using a first protocol, where each transceiver is associated with a channel;
a connection to a data network using a second protocol; and
a centralized media access controller configured to manage communications between the plurality of transceivers and the data network by connecting communications between the at least one mobile station and the plurality of transceivers using the first protocol with the connection to the data network using the second protocol,
where the centralized media access controller monitors at least one characteristic associated with each of the plurality of transceivers simultaneously, and one of the transceivers is selected from the plurality of transceivers for transmission of data based upon the at least one characteristic associated with reception on a first transceiver and neighboring transceivers of the plurality of transceivers.

2. The wireless access point of claim 1, where the centralized media access controller includes a translator that translates data contained in the first protocol to data contained in the second protocol.

3. The wireless access point of claim 1, where the first protocol is 802.11.

4. The wireless access point of claim 1, where the second protocol is Ethernet.

5. The wireless access point of claim 1, where the at least one characteristic is a received signal strength indication.

6. The wireless access point of claim 1 where the centralized media access controller further comprises an algorithm for managing the plurality of transceivers that results in a reduction in co-channel interference between the channels.

7. The wireless access point of claim 1 where the centralized media access controller further comprise an algorithm for synchronization of transmissions from the plurality of transceivers.

8. The wireless access point of claim 1 where the centralized media access controller further comprise an algorithm that uses at least one transmission frustration threshold that results in a delay of transmissions on one of the transceivers in the plurality of transceivers.

9. The wireless access point of claim 1, where the centralized media access controller further comprise an algorithm that uses at least one receive frustration threshold that results in a delay of transmissions on one of the transceivers in the plurality of transceivers.

10. The wireless access point of claim 9, where the at least one receive frustration threshold is a neighbor to the one of the transceivers in the plurality of transceivers.

11. The wireless access point of claim 1, where the centralized media access controller further comprise an algorithm that uses at least one receive frustration threshold and at least one transmission threshold that results in a delay of transmission on one of the transceivers in the plurality of transceivers.

12. The wireless access point of claim 1, where the plurality of transceivers are contained in a common housing.

13. The wireless access point of claim 1, further including:
a centralized queuing system; and
a centralized frame translation engine where the centralized media access controller accesses the centralized queuing system and the centralized frame translation engine to translate frames from the first protocol to the second protocol.

14. A method for communication with a wireless access point, comprising:
communicating between a plurality of transceivers in the wireless access point and at least one mobile station with a first protocol, where each transceiver is associated with a channel;
communicating with an interface in the wireless access point to a data network using a second protocol;
managing the plurality of transceivers at a centralized media access controller configured to manage communications between the plurality of transceivers and the data network by connecting communications between the plurality of transceivers and the at least one mobile station and the data network by communicating over the interface to the data network using the second protocol; and
executing an algorithm for managing the plurality of transceivers in the centralized media access controller that results in a reduction in co-channel interference between the channels.

15. The method for communication with a wireless access point of claim 14, further including translating data contained in the first protocol to data contained in the second protocol in the centralized media access controller.

16. The method for communication with a wireless access point of claim 14, where the first protocol is 802.11.

17. The method for communication with a wireless access point wireless access point of claim 14, where the second protocol is Ethernet.

18. The method for communication with a wireless access point of claim 14, further including simultaneously monitoring with the centralized media access controller at least one characteristic associated with each of the plurality of transceivers.

19. The method for communication with a wireless access point of claim 18, further including selecting one of the transceiver from the plurality of transceiver for transmission of data based upon the at least one characteristic of reception at a first transceiver and neighboring transceivers in the plurality of transceivers.

20. The method for communication with a wireless access point of claim 18, where the at least one characteristic is a received signal strength indication.

21. The method for communication with a wireless access point of claim 14, further includes executing an algorithm for synchronization of transmissions from the plurality of transceivers in the centralized media access controller.

22. The method for communication with a wireless access point of claim 14, further including executing an algorithm in the centralized media access controller that uses at least one transmission frustration threshold that results in a delay of transmissions on one of the transceivers in the plurality of transceivers.

23. The method for communication with a wireless access point of claim 14, further includes an algorithm that uses at least one receive frustration threshold that results in a delay of transmissions on one of the transceivers in the plurality of transceivers in the centralized media access controller.

24. The method for communication with a wireless access point of claim 23, where the at least one receive frustration threshold is a neighboring transceiver to the one of the transceivers in the plurality of transceivers.

25. The method for communication with a wireless access point of claim 14, further including executing an algorithm that uses at least one receive frustration threshold and at least one transmission threshold that results in a delay of transmission on one of the transceivers in the plurality of transceivers in the centralized media access controller.

26. The method for communication with a wireless access point of claim 14, where the plurality of transceivers are contained in a common housing.

27. The method for communication with a wireless access point of claim 14, further including translating from the first protocol to the second protocol in a centralized frame translation engine contained in the centralized media access controller, where the media access controller accesses a centralized queuing system to facilitate the translation in the centralized frame translation engine.

* * * * *